United States Patent
Nishi et al.

(10) Patent No.: US 6,707,986 B2
(45) Date of Patent: *Mar. 16, 2004

(54) IMAGE SIGNAL, DECODING METHOD, DECODING APPARATUS, DATA STORAGE MEDIUM, AND COMPUTER PROGRAM IMPLEMENTING A DISPLAY CYCLE IDENTIFIER

(75) Inventors: Takahiro Nishi, Neyagawa (JP); Shinya Kadono, Kobe (JP); Choong Seng Boon, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/824,207

(22) Filed: Apr. 3, 2001

(65) Prior Publication Data

US 2002/0018524 A1 Feb. 14, 2002

Related U.S. Application Data

(62) Division of application No. 09/176,953, filed on Oct. 22, 1998.

(30) Foreign Application Priority Data

Oct. 31, 1997 (JP) .............................................. 9-301148
Jun. 9, 1998 (JP) ............................................ 10-161096

(51) Int. Cl.[7] .............................. H04N 7/26; H04N 7/00

(52) U.S. Cl. ........................................ 386/109; 386/46

(58) Field of Search ...................... 386/6–8, 33, 45–46, 386/68, 81–82, 95, 111–112, 125–126, 109; 325/240.26, 240.28; 348/558

(56) References Cited

U.S. PATENT DOCUMENTS

| 5,491,516 A | 2/1996 | Casavant et al. |
| 6,041,142 A | 3/2000 | Rao et al. |
| 6,055,271 A | * 4/2000 | Yasuda et al. .......... 375/240.26 |

FOREIGN PATENT DOCUMENTS

| EP | 0588669 A | 3/1994 |
| JP | 09307856 | 11/1997 |
| KR | 97-50775 | 7/1997 |
| WO | 95/15659 | 6/1995 |

OTHER PUBLICATIONS

ISO/IEC JTC1/SC29/WG11 N1902 "Information Technology—Coding of Audio–Visual Objects: Visual, ISO/IEC 14496–2 Committee Draft", Oct. 1997, pp. I–V, 77–108, XP002173518.

(List continued on next page.)

*Primary Examiner*—Thai Tran
*Assistant Examiner*—Polin Chieu
(74) *Attorney, Agent, or Firm*—Wenderoth, Lind & Ponack, L.L.P.

(57) ABSTRACT

A data structure of an image signal includes a reproduction cycle identifier indicating whether the cycle of image display for each frame is variable or not. When the display cycle identifier indicates that the display cycle is fixed, display cycle data is inserted in a header of the coded image data, and data relating to the frame number is inserted in each frame. On the other hand, when the display cycle identifier indicates that the display cycle is variable, display time data is inserted for each frame. Therefore, when decoding and displaying the coded image data having a fixed display cycle, the decoded image data can be displayed by a simple circuit structure, i.e., based on the display cycle data and the frame number data having a relatively small data quantity (bit number), without referring to the display time data having a relatively large data quantity for each frame. Furthermore, this data structure can be applied to a coded image signal having a variable display cycle.

5 Claims, 16 Drawing Sheets

OTHER PUBLICATIONS

"Information Technology—Generic Coding of Moving Pictures and Associated Audio Information: Systems" International Standard, New York, NY, US, Apr. 15, 1996, pp. I–XY, 1–119, XP000667435.

ISO/IEC JTC1/SC29/WG11: "Working Draft 4.0 of ISO/IEC 14496–2" Jul. 1997, International Organisation for Standardisation—Organisation Internationale De Normalisation, Stockholm.

* cited by examiner

| frame_rate_code | frame_rate_value |
|---|---|
| 0000 | forbidden |
| 0001 | 24 000÷1001(23,976...) |
| 0010 | 24 |
| 0011 | 25 |
| 0100 | 30 000÷1001(29,97...) |
| 0101 | 30 |
| 0110 | 50 |
| 0111 | 60 000÷1001(59,94...) |
| 1000 | 60 |
| ... | reserved |
| 1111 | reserved |

IMAGE SIGNAL, DECODING METHOD, DECODING APPARATUS, DATA STORAGE MEDIUM, AND COMPUTER PROGRAM IMPLEMENTING A DISPLAY CYCLE IDENTIFIER

This is a divisional application of Ser. No. 09/176,953, filed Oct. 22, 1998.

FIELD OF THE INVENTION

The present invention relates to an image signal data structure, an image coding method, and an image decoding method. More particularly, the invention relates to an image signal data structure which includes reproduction timing data relating to the timing of reproduction including decoding and image display for each of frames as components of an image, generation (coding) of a coded image signal including the reproduction timing data, and decoding of the coded image signal.

Further, the present invention relates to an image coding apparatus for generating the coded image signal, an image decoding apparatus performing the above-described decoding, a data storage medium containing a coded image signal of the above-described data structure, and a data storage medium containing an image processing program for implementing the above-described coding and decoding by using a computer.

BACKGROUND OF THE INVENTION

In recent years, we have greeted the age of multimedia in which audio, video and other data are integrally handled, and the conventional information media, i.e., means for transmitting information to men such as newspapers, magazines, televisions, radios, and telephones, have been adopted as the objects of multimedia. Generally, "multimedia" means to represent, not only characters, but also diagrams, speeches, and especially images simultaneously in relation with each other. In order to handle the conventional information media as the objects of multimedia, it is necessary to convert the information of the media into a digital format.

When the data quantity of each information medium described above is estimated as a quantity of digital data, in the case of characters, the data quantity for each character is 1~2 byte. However, in the case of speech, the data quantity is 64 kbits per second (quality for telecommunication) and, in the case of moving picture, it is more than 100 Mbits per second (quality for current television broadcasting). Thus, in the information media such as televisions, it is not practical to process such massive data as it is in a digital format. For example, although visual telephones have already been put to practical use by ISDN (Integrated Services Digital Network) having a transmission rate of 64 kbps~1.5 Mbps, it is impossible to transmit an image of a television camera as it is by the ISDN.

As a result, data compression technologies are demanded. In the case of visual telephones, a moving picture compression technology standardized as H.261 by ITU-T (International Telecommunication Union-Telecommunication Sector) is employed. Further, according to a data compression technology of MPEG1, it is possible to record image data, together with audio data, in an ordinary music CD (compact disk).

In the image signal compression and expansion technologies according to MPEG1 and MPEG2 which have already been put to practical use, only a fixed frame rate is basically employed, namely, intervals between image display timings of the respective frames are regular. As a result, there are only several kinds of frame rates, and in MPEG2 a frame rate designated by a flag (frame rate code) which is transmitted with coded data is selected from plural frame rates (frame rate values) with reference to a table shown in FIG. 13.

Under the existing circumstances, standardization of MPEG4 is now proceeded by the working group for standardization of MPEG1 and MPEG2 (ISO/IEC JTC1/SC29/WG11). MPEG4 enables coding and signal operation in object units, and realizes new functions required in the age of multimedia. MPEG4 enables coding and signal operation in object units, and realizes new functions required in the age of multimedia. MPEG4 has originally aimed at standardization of image processing at a low bit rate, but the object of the standardization is now extended to more versatile image processing including high-bit-rate image processing adaptable to an interlaced image.

Also in MPEG4, when a table similar to the table for MPEG2 (refer to FIG. 13) is added at the beginning of a video object layer (corresponding to a video sequence of MPEG2), frame rates can be expressed according to the table. In MPEG4, however, since image signals in a broad range from an image signal of a low bit rate to a high-quality image signal of a high bit rate are processed, the number of frame rates required is out of count. Therefore, it is difficult to perform decision of frame rates by the use of a table.

As a result, MPEG4 employs a data structure including frame display time data inserted in each frame in order to deal with almost uncountable number of fixed frame rates and, furthermore, to process an image having variable intervals of image display timings or decoding timings of the respective frames.

FIG. 14 shows a data structure of a conventional coded image signal 200.

The coded image signal 200 corresponds to one image (in MPEG4, a series of frames constituting an image corresponding to one object) and includes a header H at the beginning. The header H is followed by code sequences Sa0, Sa1, Sa2, . . . , San corresponding to frames F(0), F(1), F(2), . . . , F(n), respectively, which code sequences are arranged according to priority for transmission (transmission order). Here, "n" is the number indicating the transmission order of data of each frame in the frame sequence corresponding to one image, and n of the head frame is 0.

In this example, at the beginnings of the code sequences Sa0, Sa1, Sa2, . . . , San of the respective frames, display time data Dt0, Dt1, Dt2, . . . , Dtn indicating the display timings of the frames are arranged. The respective display time data are followed by coded image data Cg0, Cg1, Cg2, . . . , Cgn.

Since each of the display time data indicates a time relative to a reference time, the quantity of data required for expressing this display time, i.e., the bit number of the display time data, increases as the number of the frames constituting the image increases.

Further, at the decoding end of the coded image signal, according to the display time data Dt0~Dtn inserted in the code sequences Sa0~San corresponding to the respective frames, image display of each frame is carried out at the time indicated by the display time data.

FIG. 15 shows the transmission order and the display order of the coded image data corresponding to each frame in the series of frames. As described above, "n" indicates the transmission order, and "n'" indicates the display order (n' of the head frame is 0). Further, frames F(n) (F(0)~F(18)) are arranged based on the order of frames in the data structure shown in FIG. 14 (transmission order). The frames F(n) arranged in the transmission order are rearranged according to the display order of the frames as shown by arrows in FIG. 15, resulting in frames F'(n') (F'(0)~F'(18)) arranged in the display order. Accordingly, a frame F(n) and a frame F'(n') related to each other with an arrow are identical. For example, the frames F(0), F(1), F(2), and F(3) are identical to the frames F'(0), F'(3), F'(1), and F'(2), respectively.

Amongst the frames F(n) (F(0)~F(18)) arranged in the transmission order, the frames F(0) and F(13) are I (Intrapicture) frames (hereinafter also referred to as I-VOP), the frames F(1), F(4), F(7), F(10), and F(16) are P (Predictive-picture) frames (hereinafter also referred to as P-VOP), and the frames F(2), F(3), F(5), F(6), F(8), F(9), F(11), F(12), F(14), F(15), F(17), and F(18) are B (Bidirectionally predictive picture) frames (hereinafter also referred to as B-VOP).

When the frames F(n) (F(0)~F(18)) arranged in the transmission order (IPBBPBBPBBPBBIBBPBB) are rearranged in the display order (IBBPBBPBBPBBPBBIBBP), this display order n' is represented by frame numbers B(n) (B(0)~B(18)) corresponding to the respective frames F(n). That is, the frame numbers B(n) represent the numbers n' indicating the display order. To be specific, as shown in FIG. 15, B(0)=0, B(1)=3, . . . , B(17)=16, B(18)=17. Accordingly, the image display cycle L of the I-VOPs is 15, and the image display cycle M of the VOPs including both of the I-VOPs and the P-VOPs is 3.

The frame number B(n)=n' is represented by the following formulae (1)~(3) using n.

$$B(n)=n=0(n=0) \quad \ldots (1)$$

$$B(n)=n+M-1(n=M\times i+1) \quad \ldots (2)$$

wherein i and M are integers not less than 0 (0, 1, 2, . . . ).

$$B(n)=n-1 \text{ (when n is other than the above values).} \quad (3)$$

The first I-VOP satisfies the condition (n=0), the I-VOPs other than the first I-VOP and the P-VOPs satisfy the condition (n=M×i+1), and the B-VOPs satisfy the condition (when n is other than the above values).

Formulae (1)~(3) define the relationship B(n)=n' between the display order n' and the transmission order n in the case where the code sequences of the frames corresponding to the respective I-VOPs, P-VOPs, and B-VOPs are transmitted periodically. In other cases than mentioned above, the display order n' and the transmission order n are correlated one to one by a relational expression or a method other than formulae (1)~(3).

FIG. 16 is a diagram for explaining an example of an image display method wherein the intervals of the image display timings of the respective frames are variable.

In the figure, t'(n') (t'(1), t'(2), t'(3), t'(4), . . . ) indicates the interval between the time at which image display of the frame F'(n'-1) is performed and the time at which image display of the frame F'(n') is performed, and h'(1), h'(2), and h'(3) indicate the times for image display of the frames F'(1), F'(2), and F'(3), respectively, with the time h'(0) for image display of the frame F'(0) as a reference. Further, h(n) (h(1), h(2), h(3), h(4), . . . ) indicates the time for image display of the frame F(n) (F(1), F(2), F(3), F(4), . . . ) with the time h'(0) for image display of the frame F(0)=F'(0) as a reference. Accordingly, the display time h'(n') of the frame F'(n') arranged in the display order is expressed by h'(n')=h'(n'-1)+t'(n'), and h'(0)=0.

Next, decoding and image display of the coded image signal having the data structure shown in FIG. 14 will be briefly described using FIG. 16.

At the decoding end, when the coded image signal 200 shown in FIG. 14 is input, the coded image data Cg0, Cg1, Cg2, of the respective frames F(0), F(1), F(2), . . . as the constituents of the coded image signal 200 are decoded, and the images corresponding to the frames F(0), F(1), F(2), . . . are displayed at the image display times h(0), h(1), h(2), . . . based on the display time data Dt0, Dt1, Dt2, . . . of the respective frames.

In this way, even when the intervals between the image display timings of the respective frames (image display cycle) of the coded image signal are not fixed, i.e., are variable, the coded image signal is decoded at the decoding end and displayed at a prescribed timing.

When the intervals between the image display timings of the respective frames of the coded image signal are fixed, as in the case where the intervals are variable, the images corresponding to the frames F(0), F(1), F(2), . . . are displayed at the image display times h(0), h(1), h(2), . . . based on the display time data Dt0, Dt1, Dt2, . . . of the respective frames.

By the way, when expressing a frame rate (number of frames displayed in a second) simply with k bits (k: natural number), a frequency used for television broadcasting, for example, 29.97 . . . Hz (to be exact, 30000/1001 Hz) cannot be expressed.

As a result, such a frame rate is expressed as follows. That is, a prescribed time interval (1 modulo time), for example, one second, is divided into N (N: natural number) to obtain a sub-unit time (1/N) and, using this as a unit of time (1 time tick), the display time of each frame is expressed for both of the image having a variable frame rate and the image having a fixed frame rate.

To be specific, as shown in FIG. 17(*a*), the display time of each of the images VOP0, VOP1, VOP2, and VOP3 corresponding to the frames F'(0), F'(1), F'(2), and F'(3) arranged in the display order is expressed by y (VOP rate increment) pieces of 1/N (subunit time) with a time X as a reference, that is, it is expressed by Y/N. For the images VOP1, VOP2, VOP3, and VOP4, y is defined as follows:.y=y'0, y=y'1, y=y'2, and y=y'3, respectively.

FIG. 17(*c*) shows a coded image signal 200*a* having a data structure in which the image display timings of the respective frames are expressed by using the sub-unit time (1/N sec) and y.

The coded image signal 200*a* includes a header H containing sub-unit time data Dk that indicates N (natural number) for obtaining the sub-unit time, and the header H is followed by code sequences Sbn (Sb0, Sb1, Sb2, . . . ) corresponding to the respective frames F(n) (F(0), F(1), F(2), . . . ). Each code sequence Sbn contains display cycle multiplier data Dyn (Dy0, Dy1, Dy2, . . . ) indicating a display time h(n) (h(0), h(1), h(2). . . ) which is measured by using the sub-unit time (1/N), and the number y of (1/N), with the time X as a reference.

In FIG. 17(*c*), Cgn (Cg0, Cg1, Cg2, . . . ) are coded image data corresponding to the respective frames F(n) (F(0), F(1), However, when the image VOP0 is an I-VOP (I frame), the VOP2 and VOP3 are B-VOPs (B frames), and the VOP4 is a P-VOP (P frame) as shown in FIG. 17(*b*), in the bit stream of the coded image signal 200*a* shown in FIG. 17(*c*), the P-VOP (VOP3) and the B-VOP (VOP1) are arranged as the code sequences of the frames F(1) and F(2) which follow the code sequence of the frame F(0) corresponding to the I-VOP (VOP0).

A description is now given of the drawbacks of the image signal data structures described with respect to FIGS. 14–16.

As described above, in a coded image signal obtained by coding an image signal having a fixed interval T of frame display timings, the image display timing h(n) of each frame is expressed by h(n)=n'×T, wherein n' is the number indicating the order of display, and n'=B(n).

In other words, when the coded image signal having the fixed frame-display interval T (i.e., a coded signal of an image having a fixed frame rate) is decoded for display, if the period T (the fixed display interval) is detectable at the decoding end, the display time h(n) of the n-th frame F(n) in the transmission order can be uniquely decided by increasing the display interval T by n' (=B(n)) times. Nevertheless, when decoding the coded image signal, there is no choice but to perform complicated display using the display time data Dtn (Dt0, Dt1, Dt2, . . . ) inserted in the coded image signals corresponding to the respective frames F(n) (F(0), F(1), F(2), . . . ) as shown in FIG. 14.

Next, a description is given of the drawbacks of the image signal data structures described with respect to FIGS. 17(a)–17(c).

As described above, in the image signal data structure proposed by the current MPEG4, even when the frame rate is fixed, the value of the frame rate cannot be known unless several frames are decoded and, therefore, it is difficult to simplify the circuit structure for implementing the actual decoding process.

This problem will be briefly described. When the VOP0 is an I-VOP (I frame), the VOP1 and the VOP2 are B-VOPs (B frames), and the VOP3 is a P-VOP (P frame) as shown in FIG. 17(b), since the frame F(0) corresponding to the I-VOP (I frame) is followed by the frame F(1) corresponding to the P-VOP (P frame) and the frame F(2) corresponding to the B-VOP (B frame) in the bit stream of the coded image signal 200a shown in FIG. 17(c), the frame display cycle (1 fixed VOP increment), i.e., the interval between the display timing of the I-VOP and the display timing of the following B-VOP (B frame), cannot be known until the frame F(2) corresponding to the B-VOP (B frame) is transmitted.

SUMMARY OF THE INVENTION

The present invention is made to solve the above-described problems and has for its object to provide an image signal data structure which enables a reproduction process including decoding and image display for a coded image signal having a fixed cycle of reproduction for each frame at the decoding end, such as a fixed frame rate (cycle of image display for each frame) by using a simple hardware structure, and also enables a reproduction process for a coded image signal having a variable cycle of reproduction for each frame, such as a variable frame rate.

Another object of the present invention is to provide an image coding method and an image coding apparatus capable of performing an image coding process which enables a reproduction process including decoding and image display for a coded image signal having a fixed cycle of reproduction for each frame at the decoding end, such as a fixed frame rate (cycle of image display for each frame) by using a simple hardware structure, and also enables a reproduction process for a coded image signal having a variable cycle of reproduction for each frame, such as a variable frame rate.

Still another object of the present invention is to provide an image decoding method and an image decoding apparatus capable of performing an accurate reproduction process including decoding and image display for a coded image signal, according to whether the cycle of reproduction for each frame is variable or not.

Yet another object of the present invention is to provide an image signal data structure which enables detection of the value of a frame rate or the like of a coded image signal having a fixed frame rate or the like before decoding each frame, and simplifies various hardware structures for implementing a reproduction process including decoding and image display.

A further object of the present invention is to provide an image coding method and an image coding apparatus capable of detecting the value of a frame rate or the like of a coded image signal having a fixed frame rate or the like before decoding each frame, and performing a reproduction process including decoding and image display for the coded image signal by a simple hardware structure.

A still further object of the present invention is to provide an image decoding method and an image decoding apparatus capable of accurately decoding the coded image signal obtained by the above-described coding process.

Another object of the present invention is to provide a data storage medium containing a coded image signal having the above-described data structure, and a data storage medium containing an image processing program for implementing, with a computer, the above-described image coding method and image decoding method.

Other objects and advantages of the invention will become apparent from the detailed description that follows. The detailed description and specific embodiments described are provided only for illustration since various additions and modifications within the spirit and scope of the invention will be apparent to those of skill in the art from the detailed description.

According to a first aspect of the present invention, there is provided a data structure of an image signal for which image reproduction of each frame is performed at a prescribed cycle, and the image signal data structure includes a reproduction cycle identifier indicating whether the cycle of image reproduction for each frame is variable or not. Therefore, when the reproduction cycle for each frame is fixed, reproduction of the image signal, such as decoding of the coded image signal and display of the decoded image signal, can be performed by a simple circuit structure.

According to a second aspect of the present invention, in the image signal data structure of the first aspect, the reproduction cycle identifier is a display cycle identifier indicating whether the cycle of image display for each frame is variable or not. Therefore, when the image display cycle for each frame is fixed, display of decoded data obtained by decoding the coded image signal can be performed by a simple circuit structure.

According to a third aspect of the present invention, the image signal data structure of the second aspect includes a fixed display cycle identifier indicating that the cycle of image display for each frame is fixed, as the display cycle identifier; display cycle data indicating the cycle of image display for each frame; and frame position data corresponding to each frame and indicating the positional relationship of each frame with the previous and subsequent frames. Therefore, when the image display cycle for each frame is fixed, the timing of image display of the frame can be defined according to the display cycle data and the frame position data.

According to a fourth aspect of the present invention, the image signal data structure of the second aspect includes a variable display cycle identifier indicating that the cycle of image display for each frame is variable, as the display cycle identifier; and display timing data indicating the timing at which image display of each frame is performed, the timing being set relatively to a desired reference time selected from at least one reference time according to each frame. Therefore, when the image display cycle for each frame is variable, the timing of image display of the frame can be defined according to the display timing data.

According to a fifth aspect of the present invention, in the image signal data structure of the first aspect, the reproduction cycle identifier is a decoding cycle identifier indicating whether the cycle of decoding of a coded image signal corresponding to each frame is variable or not. Therefore, when the decoding cycle for each frame is fixed, decoding of the coded image signal can be performed by a simple circuit structure.

According to a sixth aspect of the present invention, the image signal data structure of the fifth aspect includes a fixed decoding cycle identifier indicating that the cycle of decoding for each frame is fixed, as the decoding cycle identifier; decoding cycle data indicating the cycle of decoding for each frame; and frame position data corresponding to each frame and indicating the positional relationship of each frame with the previous and subsequent frames. Therefore, when the decoding cycle for each frame is fixed, the timing of decoding of the frame can be defined according to the decoding cycle data and the frame position data.

According to a seventh aspect of the present invention, the image signal data structure of the fifth aspect includes a variable decoding cycle identifier indicating that the cycle of decoding for each frame is variable, as the decoding cycle identifier; and decoding timing data indicating the timing at which decoding of each frame is performed, the timing being set relatively to a desired reference time selected from at least one reference time, according to each frame. Therefore, when the decoding cycle for each frame is variable, the timing of decoding of the frame can be defined according to the decoding timing data.

According to an eighth aspect of the present invention, there is provided an image coding method for coding an image signal corresponding to a specific image to generate a coded image signal, and outputting the coded image signal together with a reproduction cycle identifier indicating whether the cycle of image reproduction for each of frames constituting the image is variable or not. In this method, when an image signal having a fixed cycle of image reproduction for each frame is input as the image signal to be coded, reproduction cycle data and frame position data are output together with the reproduction cycle identifier, the reproduction cycle data indicating the cycle of image reproduction for each frame, and the frame position data corresponding to each frame and indicating the positional relationship of each frame with the previous and subsequent frames. When an image signal having a variable cycle of image reproduction for each frame is input as the image signal to be coded, reproduction timing data is output together with the reproduction cycle identifier, the reproduction timing data indicating the timing at which image reproduction of each frame is performed, the timing being set relatively to a desired reference time selected from at least one reference time, according to each frame. In this method, an image signal having a variable cycle of image reproduction for each frame and an image signal having a fixed cycle of image reproduction for each frame can be coded together with data indicating the reproduction timing of each frame according to each image signal. Therefore, when the reproduction cycle for each frame is fixed, the bit number required for setting the reproduction time can be reduced and, furthermore, reproduction of the image having a variable frame reproduction cycle can be performed in the same manner as the conventional reproduction.

According to a ninth aspect of the present invention, in the image coding method of the eighth aspect, the reproduction cycle identifier is a display cycle identifier indicating whether the cycle of image display for each frame is variable or not; the reproduction cycle data is display cycle data indicating the cycle of image display for each frame; and the reproduction timing data is display timing data indicating the timing at which image display of each frame is performed, the timing being set relatively to a desired reference time selected from at least one reference time, according to each frame. Therefore, when the display cycle for each frame is fixed, the bit number required for setting the display time can be reduced and, furthermore, display of the image having a variable frame display cycle can be performed in the same manner as the conventional display.

According to a tenth aspect of the present invention, in the image coding method of the eighth aspect, the reproduction cycle identifier is a decoding cycle identifier indicating whether the cycle of decoding of coded image data corresponding to each frame is variable or not; the reproduction cycle data is decoding cycle data indicating the cycle of decoding for each frame; and the reproduction timing data is decoding timing data indicating the timing at which decoding of each frame is performed, the timing being set relatively to a desired reference time selected from at least one reference time, according to each frame. Thereby, when the decoding cycle for each frame is fixed, the bit number required for setting the decoding time of each frame can be reduced and, furthermore, decoding of the image having a variable frame decoding cycle can be performed in the same manner as the conventional decoding.

According to an eleventh aspect of the present invention, there is provided an image decoding method for decoding a coded image signal which includes coded image data corresponding to frames constituting an image, and a reproduction cycle identifier indicating whether the cycle of image reproduction for each frame is variable or not. In this method, when the reproduction cycle identifier indicates that the cycle of image reproduction for each frame is fixed, decoded image data obtained by decoding the coded image data corresponding to each frame becomes image data having a reproduction timing which is decided according to reproduction cycle data indicating the cycle of image reproduction for each frame and frame position data indicating the positional relationship of each frame with the previous and subsequent frames, which data are included in the coded image signal. When the reproduction cycle identifier indicates that the cycle of image reproduction for each frame is variable, decoded image data obtained by decoding the coded image data corresponding to each frame is image data having a reproduction timing decided according to reproduction timing data which is included in the coded image signal and indicates the timing at which image reproduction of each frame is carried out, the timing being set relatively to a desired reference time selected from at least one reference time, according to each frame. Therefore, reproduction of the coded image signal, including decoding and display, can be accurately performed according to whether the reproduction timing of each frame of the coded image signal is variable or not.

According to a twelfth aspect of the present invention, in the image decoding method of the eleventh aspect, the reproduction cycle identifier is a display cycle identifier indicating whether the cycle of image display for each frame is variable or not; the reproduction cycle data is display cycle data indicating the cycle of image display for each frame; and the reproduction timing data is display timing data indicating the timing at which image display of each frame is performed. Therefore, display of the image signal can be accurately performed according to whether the display timing of each frame of the coded image signal is variable or not.

According to a thirteenth aspect of the present invention, in the image decoding method of the eleventh aspect, a decoding timing at which decoding of each frame is carried out is set according to display timing data of plural frames including an object frame to be decoded. Therefore, not only display but also decoding of each frame can be carried out according to the display timing data.

According to a fourteenth aspect of the present invention, in the image decoding method of the thirteenth aspect, based on the display timing data of the object frame and the display timing data of the next frame transmitted subsequently to the object frame, the decoding timing of the object frame is set at a timing that is earlier, by a prescribed offset time, than the earlier display timing between the display timings of the object frame and the next frame. Therefore, decoding of each frame can be performed according to the display timing data, without impeding the flow of display.

According to a fifteenth aspect of the present invention, in the image decoding method of the fourteenth aspect, when the display timing of the object frame is earlier than the display timing of the next frame, the offset time is set to a length longer than the time required for decoding the object frame; and when the display timing of the next frame is earlier than the display timing of the object frame, the offset time is set to a length longer than the sum of the time required for decoding the object frame and the time required for decoding the next frame. Therefore, decoding of a coded image data corresponding to a series of frames including P-VOP and B-VOP as well as I-VOP can be performed according to the display timing data.

According to a sixteenth aspect of the present invention, in the image decoding method of the eleventh aspect, the reproduction cycle identifier is a decoding cycle identifier indicating whether the cycle of decoding of coded image data corresponding to each frame is variable or not; the reproduction cycle data is decoding cycle data indicating the cycle of decoding for each frame; and the reproduction timing data is decoding timing data indicating the timing at which decoding of each frame is performed. Therefore, decoding of the coded image signal can be accurately performed according to whether the decoding timing of each frame of the coded image signal is variable or not.

According to a seventeenth aspect of the present invention, the image signal data structure of the first aspect further includes sub-unit time data indicating the length of a sub-unit time which is obtained by dividing a prescribed time interval into N (natural number), by the natural number N; and reproduction cycle multiplier data indicating that the cycle of image reproduction for each frame is the sub-unit time multiplied by M (natural number), by the multiplier M. Therefore, when a coded image signal having a fixed frame rate is processed, the value of the frame rate can be detected before decoding each frame, whereby various hardware structures for implementing reproduction including decoding and display can be simplified.

According to an eighteenth aspect of the present invention, in the image signal data structure of the seventeenth aspect, the reproduction cycle identifier is a display cycle identifier indicating whether the cycle of image display for each frame is variable or not; and the reproduction cycle multiplier data is display cycle multiplier data which indicates that the cycle of image display for each frame is the sub-unit time multiplied by M (natural number), by the multiplier M. Therefore, various hardware structures for implementing image display can be simplified.

According to a nineteenth aspect of the present invention, in the image signal data structure of the seventeenth aspect, the reproduction cycle identifier is a decoding cycle identifier indicating whether the cycle of decoding for each frame is variable or not; and the reproduction cycle multiplier data is decoding cycle multiplier data which indicates that the cycle of decoding for each frame is the sub-unit time multiplied by M (natural number), by the multiplier M. Therefore, various hardware structures for implementing decoding can be simplified.

According to a twentieth aspect of the present invention, there is provided an image coding method for coding an image signal corresponding to a specific image to generate a coded image signal, and outputting the coded image signal together with a reproduction cycle identifier indicating whether the cycle of image reproduction for each of frames constituting the image is variable or not. In this method, when an image signal having a fixed cycle of image reproduction for each frame is input as the image signal to be coded, sub-unit time data and reproduction cycle multiplier data are output together with the reproduction cycle identifier, the sub-unit time data indicating the length of a sub-unit time which is obtained by dividing a prescribed time interval into N (natural number), by the natural number N, and the reproduction cycle multiplier data indicating that the cycle of image reproduction for each frame is the sub-unit time multiplied by M (natural number), by the multiplier M. Therefore, when a coded image signal having a fixed frame rate is processed, the value of the frame rate can be detected before decoding each frame, whereby reproduction including decoding and display can be performed with a simple hardware structure.

According to a twenty-first aspect of the present invention, in the image coding method of the twentieth aspect, the reproduction cycle identifier is a display cycle identifier indicating whether the cycle of image display for each frame is variable or not; and the reproduction cycle multiplier data is display cycle multiplier data which indicates that the cycle of image display for each frame is the sub-unit time multiplied by M (natural number), by the multiplier M. Therefore, various hardware structures for implementing display at the decoding end can be simplified.

According to a twenty-second aspect of the present invention, in the image coding method of the twentieth aspect, the reproduction cycle identifier is a decoding cycle identifier indicating whether the cycle of decoding for each frame is variable or not; and the reproduction cycle multiplier data is decoding cycle multiplier data which indicates that the cycle of decoding for each frame is the sub-unit time multiplied by M (natural number), by the multiplier M. Therefore, various hardware structures for implementing decoding can be simplified.

According to a twenty-third aspect of the present invention, there is provided an image decoding method for decoding a coded image signal including the following data: coded image data corresponding to frames constituting an image; a reproduction cycle identifier indicating whether the cycle of image reproduction for each frame is variable or not; sub-unit time data indicating the length of a sub-unit time which is obtained by dividing a prescribed time interval into N (natural number), by the natural number N; and reproduction cycle multiplier data indicating that the cycle of image reproduction for each frame is the sub-unit time multiplied by M (natural number), by the multiplier M. In this method, when the reproduction cycle identifier indicates that the cycle of image reproduction for each frame is fixed, decoded image data obtained by decoding the coded image data corresponding to each frame makes image data having a reproduction timing which is decided according to the sub-unit time data indicating the length of the sub-unit time and the reproduction cycle multiplier data indicating the cycle of image reproduction for each frame. Therefore, when a coded image signal having a fixed frame rate is processed, the value of the frame rate can be detected before decoding each frame, whereby the hardware structure at the decoding end can be simplified.

According to a twenty-fourth aspect of the present invention, in the image decoding method of the twenty-third aspect, the reproduction cycle identifier is a display cycle identifier indicating whether the cycle of image display for each frame is variable or not; and the reproduction cycle multiplier data is display cycle multiplier data which indicates that the cycle of image display for each frame is the sub-unit time multiplied by M (natural number), by the multiplier M. Therefore, the hardware structure for display at the decoding end can be simplified.

According to a twenty-fifth aspect of the present invention, in the image decoding method of the twenty-third aspect, the reproduction cycle identifier is a decoding cycle identifier indicating whether the cycle of decoding for each frame is variable or not; and the reproduction cycle multiplier data is decoding cycle multiplier data which indicates that the cycle of decoding for each frame is the sub-unit time multiplied by M (natural number), by the multiplier M. Therefore, the hardware structure for decoding at the decoding end can be simplified.

According to a twenty-sixth aspect of the present invention, there is provided an image coding apparatus for coding an image signal corresponding to a specific image, and the apparatus comprises an encoder for coding an input image signal and outputting coded image data; a cycle decision unit for deciding whether the cycle of image reproduction for each of frames constituting the image is variable or not, based on the image signal, and outputting a reproduction cycle identifier indicating the result of the decision; a first data generator for generating reproduction cycle data indicating the cycle of image reproduction for each frame, according to the image signal; a second data generator for generating frame position data corresponding to each frame and indicating the positional relationship of each frame with the previous and subsequent frames, according to the image signal; a third data generator for generating reproduction timing data indicating the timing at which image reproduction for each frame is carried out, according to the image signal; an ON/OFF switch for switching the circuit between the ON state where the reproduction cycle data is transmitted and the OFF state where the reproduction cycle data is cut off, according to the reproduction cycle identifier; a selector switch for selecting one of the frame position data and the reproduction timing data, according to the reproduction cycle identifier; a multiplexer for multiplexing the outputs from the encoder, the cycle decision unit, and the switches in a prescribed order; and the image coding apparatus outputting a bit stream obtained by the multiplication as a coded image signal. In this apparatus, an image signal having a variable cycle of image reproduction for each frame and an image signal having a fixed cycle of image reproduction for each frame can be coded with data indicating the reproduction timing of each frame according to each image signal. Therefore, when the reproduction cycle for each frame is fixed, the bit number required for setting the reproduction time can be reduced and, furthermore, reproduction of the image having a variable frame reproduction cycle can be performed easily.

According to a twenty-seventh aspect of the present invention, there is provided an image decoding apparatus for decoding and reproducing the coded image signal output from the image coding apparatus of the twenty-sixth aspect, and the apparatus comprises a demultiplexer for receiving the coded image signal, and separating the coded image signal into the coded image data, the reproduction cycle identifier, the reproduction cycle data, the frame position data, and the reproduction timing data, and then outputting these data; a decoder for decoding the coded image data, frame by frame, to generate decoded image data; an ON/OFF switch for switching the circuit between the ON state where the reproduction cycle data is transmitted and the OFF state where the reproduction cycle data is cut off, according to the reproduction cycle identifier; a selector switch for selecting one of the frame position data and the reproduction timing data, according to the reproduction cycle identifier; and a display unit for performing image display of each frame according to the decoded image data; wherein at least one of the decoding by the decoder and the image display by the display unit is performed at a reproduction timing decided by the reproduction cycle data and the frame position data or a reproduction timing decided by the reproduction timing data, according to the reproduction cycle identifier. Therefore, reproduction of the coded image signal, including decoding and display, can be accurately performed according to whether the reproduction timing of each frame of the coded image signal is variable or not.

According to a twenty-eighth aspect of the present invention, there is provided an image coding apparatus for coding an image signal corresponding to a specific image, and the apparatus comprises an encoder for coding an input image signal and outputting coded image data; a cycle decision unit for deciding whether the cycle of image reproduction for each of frames constituting the image is variable or not, based on the image signal, and outputting a reproduction cycle identifier indicating the result of the decision; a first data generator for generating sub-unit time data indicating the length of a sub-unit time which is obtained by dividing a prescribed time interval into N (natural number), by the natural number N; a second data generator for generating reproduction cycle multiplier data indicating that the cycle of image reproduction for each frame is the sub-unit time multiplied by M (natural number), by the multiplier M, according to the image signal; a third data generator for generating reproduction timing data indicating the timing at which image reproduction of each frame is carried out, according to the image signal; a first ON/OFF switch for switching the circuit between the ON state where the sub-unit time data is transmitted and the OFF state where the sub-unit time data is cut off, according to the reproduction cycle identifier; a second ON/OFF switch for switching the circuit between the ON state where the reproduction cycle multiplier data is transmitted and the OFF state where the reproduction cycle multiplier data is cut off, according to the reproduction cycle identifier; a multiplexer for multiplexing the outputs from the encoder, the cycle decision unit, the third data generator, and the first and second ON/OFF switches in a prescribed order; and the image coding apparatus outputting a bit stream obtained by the multiplication as a coded image signal. Therefore, when a coded image signal having a fixed frame rate is processed at the decoding end, the value of the frame rate can be detected before decoding each frame, whereby reproduction of the coded image signal, including decoding and display, can be performed by a simple hardware structure.

According to a twenty-ninth aspect of the present invention, there is provided an image decoding apparatus for decoding and reproducing the coded image signal output from the image coding apparatus of the twenty-eighth aspect, and the apparatus comprises a demultiplexer for receiving the coded image signal, and separating the coded image signal into the coded image data, the reproduction cycle identifier, the sub-unit time data, the reproduction cycle multiplier data, and the reproduction timing data, and then outputting these data; a decoder for decoding the coded image data, frame by frame, to generate decoded image data; a first ON/OFF switch for switching the circuit between the ON state where the reproduction cycle multiplier data is transmitted and the OFF state where this data is cut off, according to the reproduction cycle identifier; a second ON/OFF switch for switching the circuit between the ON state where the reproduction timing data is transmitted and the OFF state where this data is cut off, according to the reproduction cycle identifier; a display unit for performing image display of each frame according to the decoded image data; wherein at least one of the decoding by the decoder and the image display by the display unit is performed at a reproduction timing decided by the sub-unit time data and the reproduction cycle multiplier data or a reproduction timing decided by the reproduction timing data, according to the reproduction cycle identifier. Therefore, when a coded image signal having a fixed frame rate is processed, the value of the frame rate can be detected before decoding each frame, whereby the hardware structure at the decoding end can be simplified.

According to a thirtieth aspect of the present invention, there is provided a data storage medium containing an image signal for which image reproduction for each frame is performed at a prescribed cycle, and the image signal includes a reproduction cycle identifier indicating whether the cycle of image reproduction for each frame is variable or not. Therefore, by using the data storage medium, when the reproduction cycle for each frame is fixed, reproduction of the image signal, such as decoding of the coded image signal and display of the decoded image signal, can be performed with a simple circuit structure.

According to a thirty-first aspect of the present invention, there is provided a data storage medium containing an image signal for which image reproduction for each frame is performed at a prescribed cycle, and the image signal includes a reproduction cycle identifier indicating whether image reproduction for each frame is variable or not; sub-unit time data indicating the length of a sub-unit time which is obtained by dividing a prescribed time interval into N (natural number), by the natural number N; and reproduction cycle multiplier data indicating that the cycle of image reproduction for each frame is the sub-unit time multiplied by M (natural number), by the multiplier M. Therefore, by using the data storage medium, the value of a fixed frame rate of a coded image signal can be detected before decoding each frame, whereby various hardware structures for implementing reproduction including decoding and display can be simplified.

According to a thirty-second aspect of the present invention, there is provided a data storage medium containing an image processing program, and the image processing program is a coding program which enables a computer to execute the coding of an image signal by the image coding method of the eighth aspect. Therefore, by loading the program in a computer, it is possible to implement an apparatus that can reduce the bit number required for setting the reproduction time when the frame reproduction cycle is fixed, and that can facilitate reproduction of an image having a variable frame reproduction cycle.

According to a thirty-third aspect of the present invention, there is provided a data storage medium containing an image processing program, and the image processing program is a decoding program which enables a computer to execute the decoding of a coded image signal by the image decoding method of the eleventh aspect. Therefore, by loading the program in a computer, it is possible to implement an apparatus that can accurately perform reproduction of the coded image signal, including decoding and display, according to whether the reproduction timing of each frame is variable or not.

According to a thirty-fourth aspect of the present invention, there is provided a data storage medium containing an image processing program, and the image processing program is a coding program which enables a computer to execute the coding of an image signal by the image coding method of the twentieth aspect. Therefore, by loading the program in a computer, it is possible to implement an apparatus that can detect the value of a fixed frame rate of a coded image signal before decoding each frame, and that can perform reproduction of the coded image signal, including decoding and display, by a simple hardware structure.

According to a thirty-fifth aspect of the present invention, there is provided a data storage medium containing an image processing program, and the image processing program is a decoding program which enables a computer to execute the decoding of a coded image signal by the image decoding method of the twenty-third aspect. Therefore, by loading the program in a computer, it is possible to implement an apparatus that can detect the value of a fixed frame rate of a coded image signal before decoding each frame, and that can simplify the hardware structure at the decoding end.

DETAILED DESCRIPTION OF THE PREFERRED EMBODIMENTS

[Embodiment 1]

Figure 1:
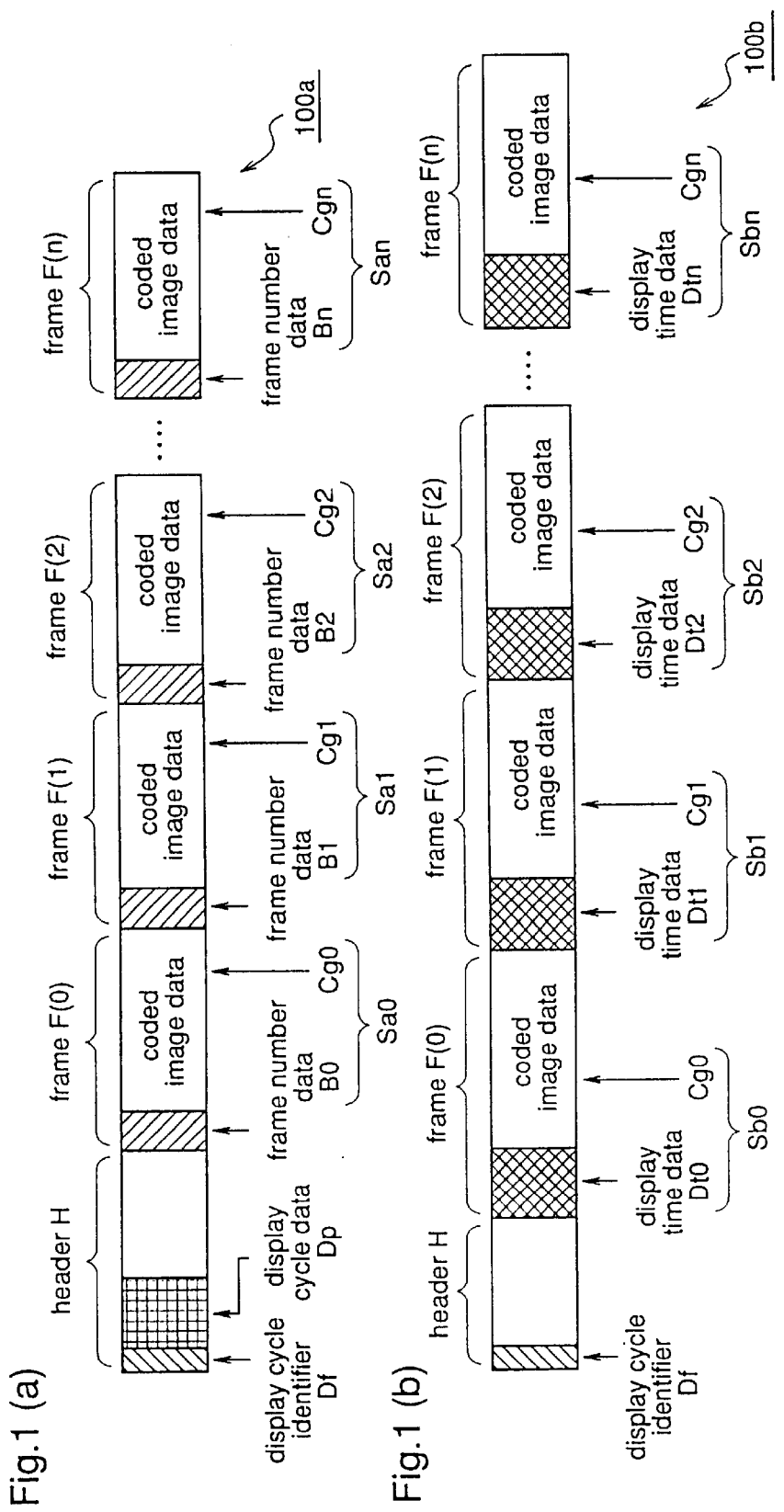
FIGS. 1(a) and 1(b) are diagrams illustrating the data structure of a coded image signal having a fixed frame display cycle and the data structure of a coded image signal having a variable frame display cycle, respectively, according to a first embodiment of the present invention.

FIG. 1(a) shows a data structure of a coded image signal 100a having a fixed (constant) frame display cycle according to a first embodiment of the present invention. FIG. 1(b) shows a data structure of a coded image signal 100b having a variable frame display cycle according to the first embodiment.

The coded image signal 100a shown in FIG. 1(a) is obtained by coding an image signal corresponding to one image (in MPEG4, an image corresponding to one object) and having a fixed frame display cycle. The coded image signal 100a includes a header H at the beginning, and the header H is followed by code sequences Sa0, Sa1, Sa2, ..., San corresponding to the respective frames F(0), F(1), F(2), ..., F(n), which code sequences are arranged in the transmission order.

In the coded image signal 100a, the header H contains a display cycle identifier Df indicating that the frame display cycle is fixed (fixed display cycle identifier), and display cycle data Dp indicating the frame display cycle. Frame number data B0, B1, B2, ..., Bn are inserted at the beginnings of the code sequences Sa0, Sa1, Sa2, ..., San corresponding to the respective frames, and each frame number data indicates the frame number B(n) corresponding to the order n' for displaying the frame. Further, the code sequences Sa0, Sa1, Sa2, ..., San corresponding to the respective frames contain coded image data Cg0, Cg1, Cg2, ..., Cgn obtained by coding image signals of the respective frames, respectively.

Figure 2:
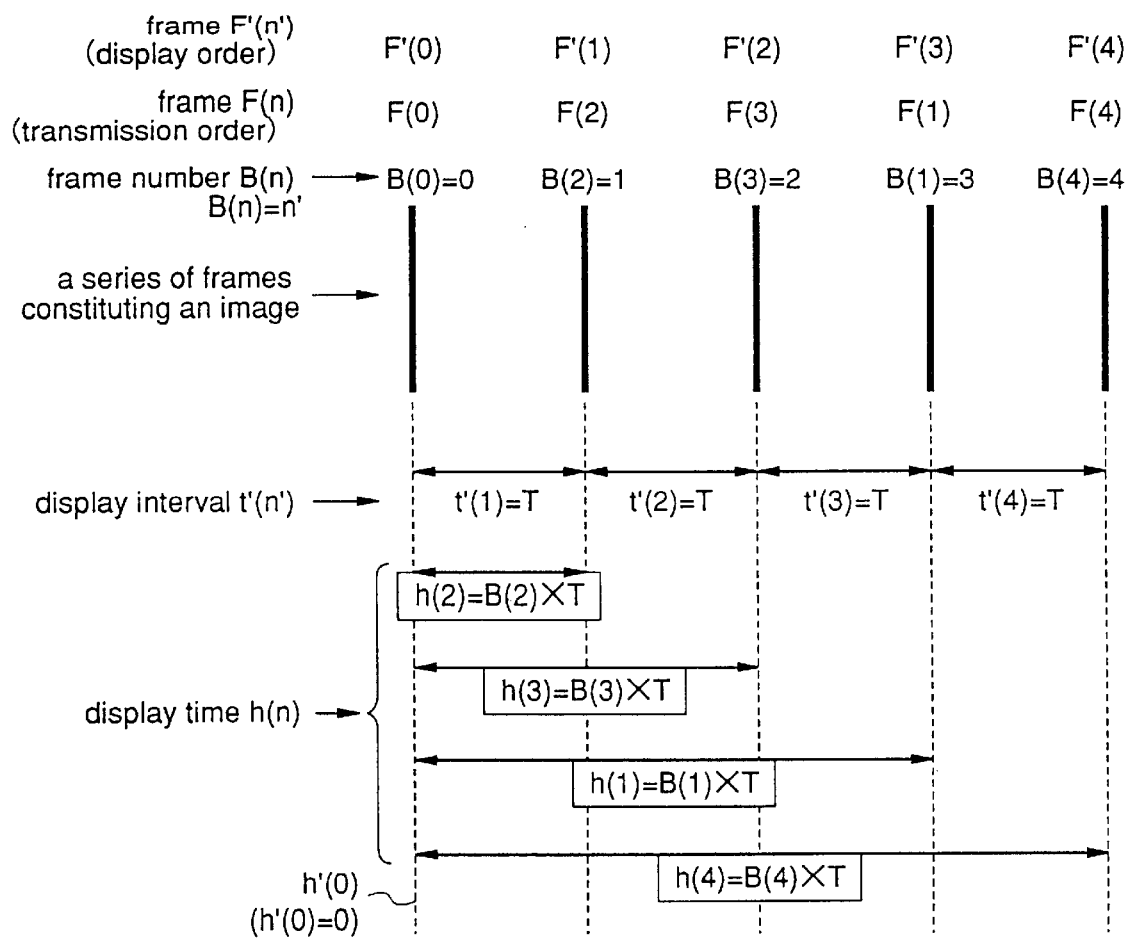
FIG. 2 is a diagram for explaining image display based on the coded image signal having a fixed frame display cycle according to the first embodiment.
Figure 16:
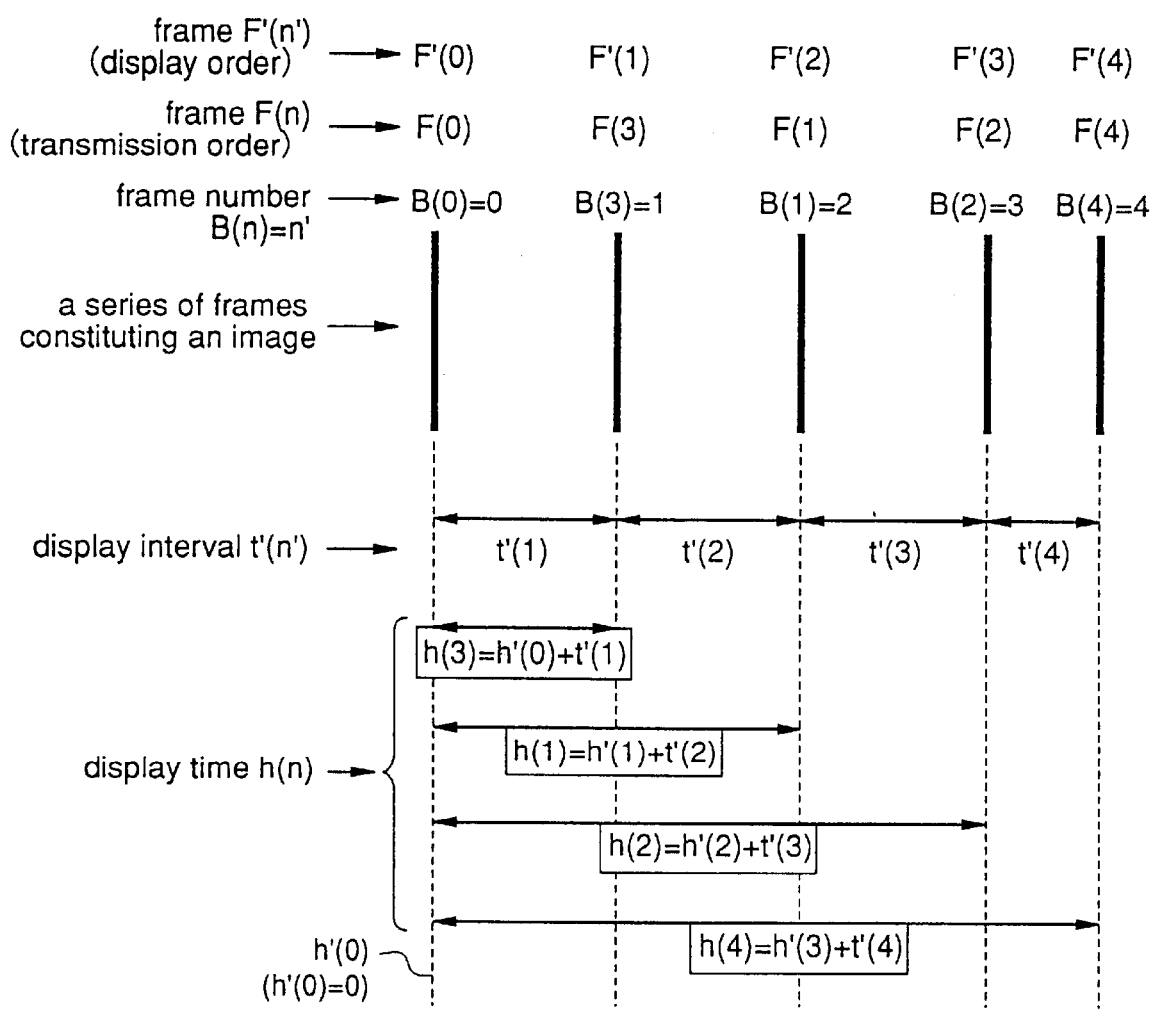
FIG. 16 is a diagram for explaining image display based on a conventional coded image signal having a variable frame display cycle.

FIG. 2 is a diagram for explaining an example of an image display method in which the intervals of image display timings of the respective frames are fixed. In the figure, the same reference numerals as those shown in FIG. 16 denote the same components, and T indicates a frame display cycle of an image in which the intervals of frame display timings are fixed.

In the coded image signal 100a, as shown in FIG. 2, the display times h(n) of the frames F(n) (n=0,1,2, ...) arranged in the transmission order are expressed by h(n)=B(n)×T when the display time h(0) (=h'(0)) of the frame F(0) is 0. To be specific, the display time h(2) of the frame F(2) is expressed by h(2)=B(2)×T, the display time h(3) of the frame F(3) is expressed by h(3)=B(3)×T, the display time h(1) of the frame F(1) is expressed by h(1)=B(1)×T, and the display time h(4) of the frame F(4) is expressed by h(4)=B(4)×T.

Accordingly, in the reproduction of the coded image signal 100a, decoded image data obtained by decoding the coded image data corresponding to the respective frames are successively displayed at the display times h(n). The frame number B(n) indicating the number n' of the display order is determined as a function of the number n of the transmission order, according to the formulae (1)~(3).

On the other hand, the coded image signal 100b shown in FIG. 1(b) is obtained by coding an image signal corresponding to one image (in MPEG4, an image corresponding to one object) and having a variable frame display cycle. The coded image signal 100b includes a header H at the beginning, and the header H is followed by code sequences Sb0, Sb1, Sb2, ..., Sbn corresponding to the respective frames F(0), F(1), F(2), ..., F(n) which are arranged in the transmission order.

In the coded image signal 100b, the header H contains a display cycle identifier Df indicating that the frame display cycle is variable (variable display cycle identifier). Display time data (display timing data) Dt0, Dt1, Dt2, ..., Dtn indicating the display times h(0), h(1), h(2), ..., h(n) at which the respective frames F(0), F(1), F(2), ..., F(n) are to be displayed are inserted at the beginnings of the code sequences Sb0, Sb1, Sb2, ..., Sbn corresponding to the respective frames. Further, the coded sequences Sb0, Sb1, Sb2, ..., Sbn corresponding to the respective frames include coded image data Cg0, Cg1, Cg2, ..., Cgn obtained by coding the image signals of the respective frames.

Figures 13, 14:
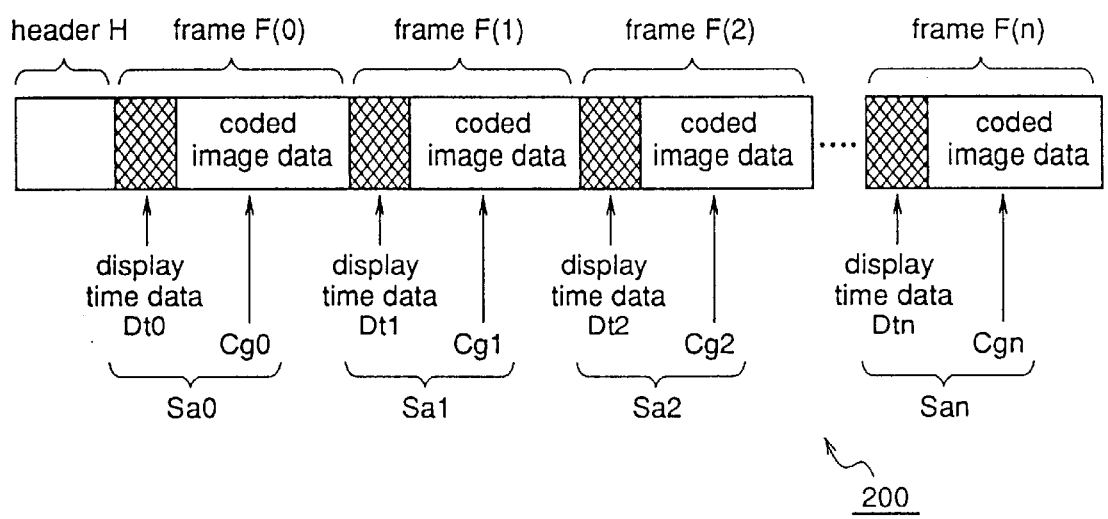
FIG. 13 is a diagram illustrating a table of fixed frame rates of MPEG2.
FIG. 14 is a diagram for explaining a coded image signal having a conventional data structure.
Figure 15:
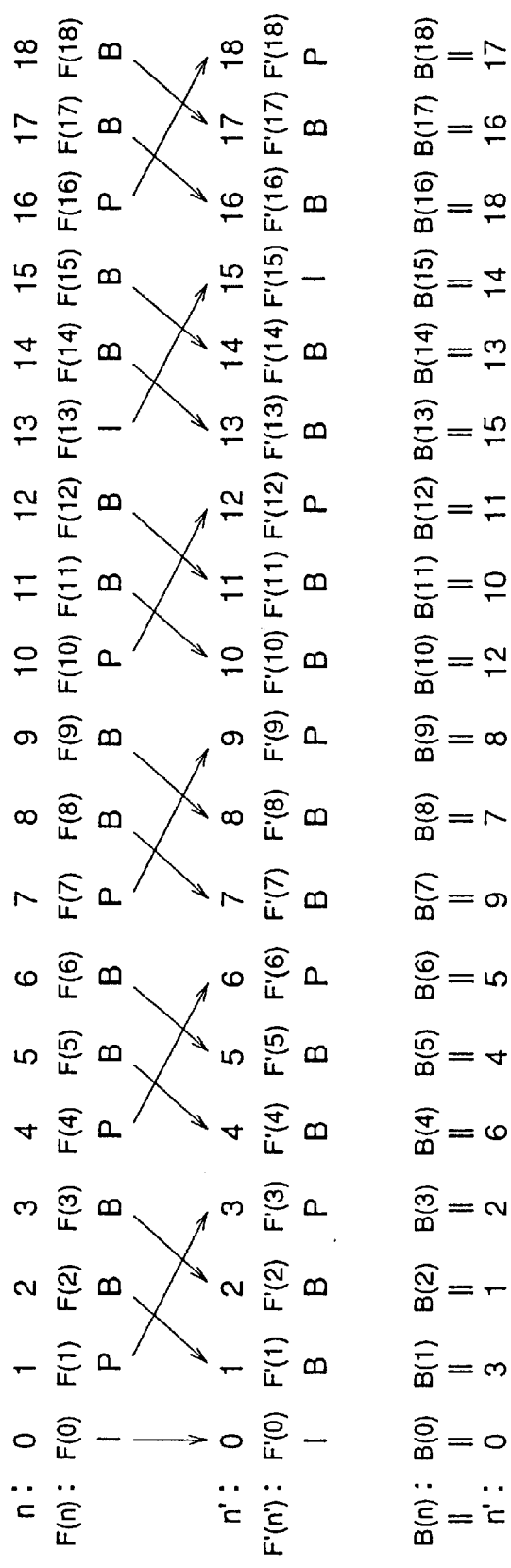
FIG. 15 is a diagram illustrating the data transmission order in a series of frames constituting one image, in comparison with the data display order.

When reproducing the coded image signal 100b, image display is carried out in like manner as that described for the coded image signal 200 having the conventional data structure shown in FIG. 14.

A description is now given of the function and effect.

According to the first embodiment of the invention, in the coded image signal 100a having a fixed frame display cycle (FIG. 1(a)), the fixed display cycle identifier Df indicating that the frame display cycle is fixed and the display cycle data Dp indicating the frame display cycle are inserted in the header of the whole image data, and the frame number data B0, B1, B2, ..., Bn respectively indicating the frame numbers B(0), B(1), B(2), ... B(n) are inserted in the respective frames.

In the coded image signal 100a having such data structure, the display cycle data Dp indicates the frame display cycle T, and the frame number data Bn of each frame indicates what number the frame in one image is when counted in the display order. Therefore, the display time h(n) of each frame F(n) can be uniquely decided by these data Dp and Bn.

On the other hand, in the coded image signal 100b having a variable frame display cycle (FIG. 1(b)), the variable display cycle identifier Df indicating that the frame display interval is variable is inserted in the header of the whole image data, and the display time data Dt0, Dt1, Dt2, . . . , Dtn indicating the display times h(0), h(1), h(2), . . . , h(n) of the respective frames are inserted in the respective frames like the data structure of the conventional coded image signal 200.

Therefore, when reproducing the coded image signal 100b, the images of the respective frames F(0)~F(n) are displayed at the display times h(0)~h(n) indicated by the display time data Dt0~Dtn.

As described above, since the display cycle identifier Df indicating whether the frame display cycle is fixed or variable is inserted in the header of the coded image signal, even an image having a variable frame display cycle can be handled. For an image having a fixed frame display cycle, image display of each frame can be carried out according to the display cycle data Dp and the frame number data Bn having a relatively small data quantity, without referring to the display time data Dt0~Dtn having relatively large data quantities. Therefore, the circuit structure of an image processing circuit at the decoding end can be simplified.

Figure 3:
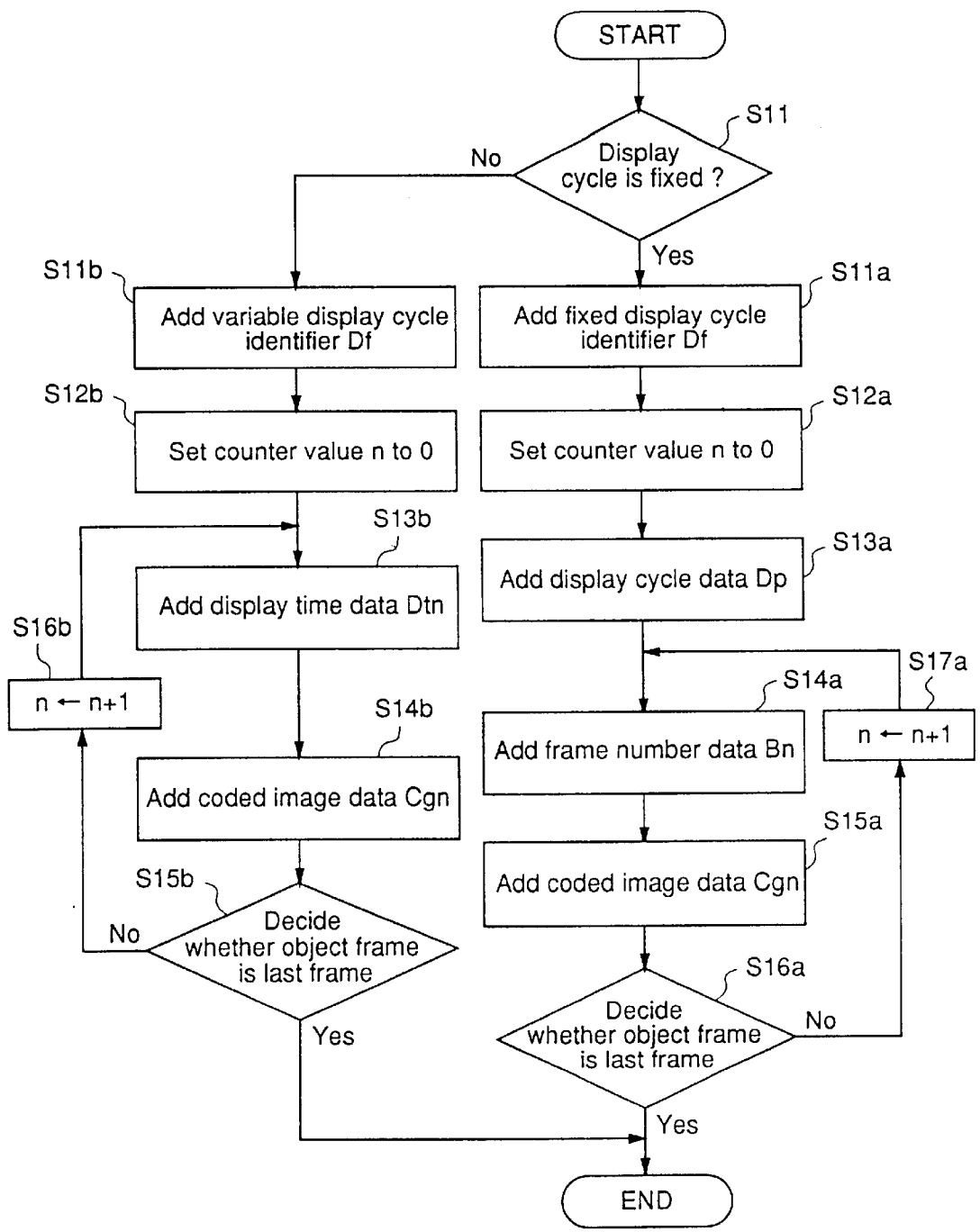
FIG. 3 is a flowchart of a coding process for generating the coded image signals having the data structures according to the first embodiment.

Hereinafter, a description is given of an image signal coding process for generating the coded image signals 100a and 100b, and a decoding process for decoding these coded image signals. FIG. 3 is a flowchart of the coding process. In the figure, "n" is the number corresponding to the transmission order of data of each frame in a series of frames constituting an image.

In the coding process, first of all, it is decided whether the frame display cycle of an input image signal corresponding to a specific image is fixed or variable (step S11). When the result of the decision is that the frame display cycle is fixed, a fixed display cycle identifier Df indicating that the frame display cycle is fixed is added to the header H of the bit stream corresponding to the image signal (step S11a). Further, the number n indicating the transmission order of each frame is used as a count value, and this count value n is set to 0 (step S12a). Subsequently, display cycle data Dp indicating the fixed frame display cycle T is added to the header of the bit stream corresponding to the image signal (step S13a). Next, as a code sequence Sa0 corresponding to the first frame F(0) of the specific image in the transmission order, frame number data Bn(=B0) and coded image data Cgn(=Cg0) are successively added to the header H (steps S14a and S15a). Thereafter, it is decided whether or not the frame being processed in the image signal coding process (hereinafter referred to as "object frame") is the last frame of the specific image in the transmission order (step S16a). When the object frame is not the last frame, the count value n is incremented by 1 (step S17a), and the following frame F(1) is subjected to the processes of steps S14a~S17a.

The processes of steps S14a–S17a are repeated until it is decided in step S16a that the object frame is the last frame.

On the other hand, when the result of the decision in step S11 is that the frame display cycle is variable, a variable display cycle identifier Df indicating that the frame display cycle is variable is added to the header H of the bit stream corresponding to the image signal (step S11b). Further, the number n indicating the transmission order of each frame is used as a count value, and this count value n is set to 0 (step S12b). Next, as a code sequence corresponding to the first frame F(0) of the specific image in the transmission order, display time data Dtn (=Dt0) and coded image data Cgn(=Cg0) are successively added to the header H (steps S13b and S14b). Thereafter, it is decided whether or not the frame being processed in the image signal coding process (object frame) is the last frame of the specific image in the transmission order (step S15b). When the object frame is not the last frame, the count value n is incremented by 1 (step S16b), and the following frame F(1) is subjected to the processes of steps S13b~S16b.

The processes in steps S13b~S16b are repeated until it is decided in step S15b that the object frame is the last frame.

Figure 4:
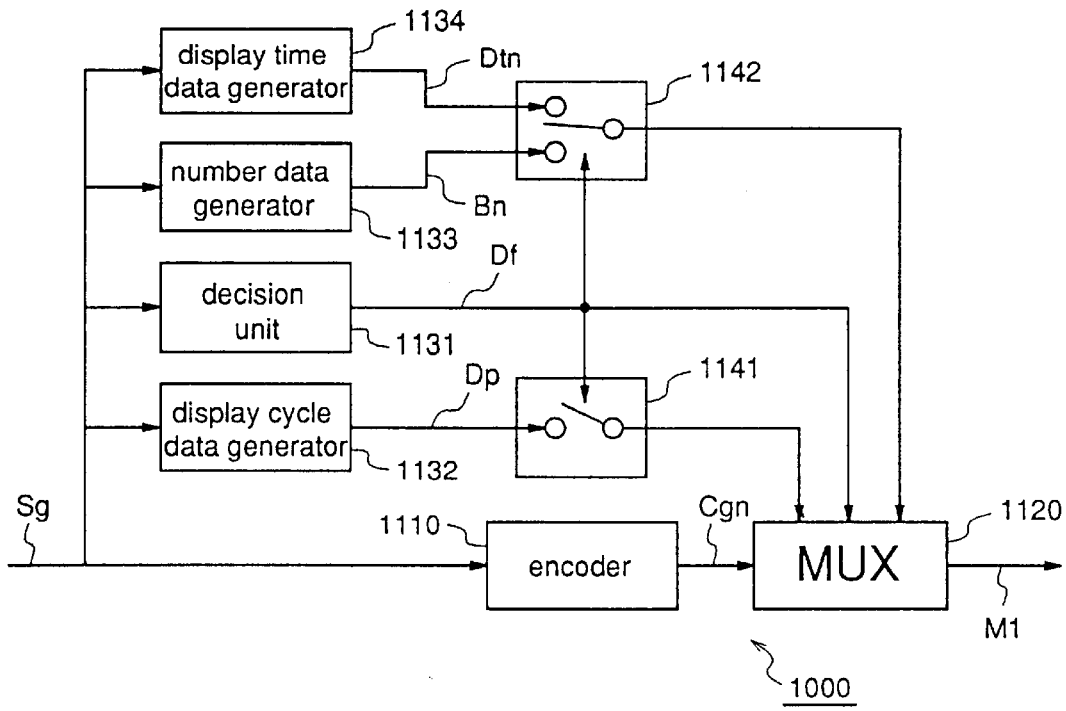
FIGS. 4(a) and 4(b) are block diagrams illustrating the structures of image coding apparatuses according to the first embodiment and a modification of the first embodiment, respectively.
Figure 4:
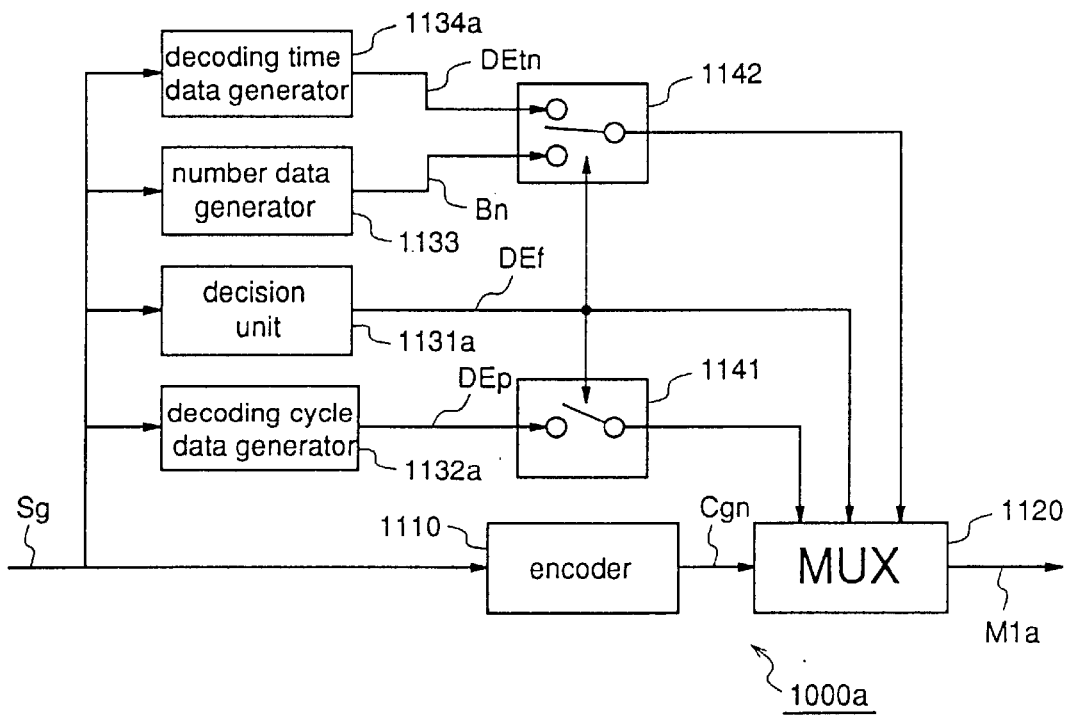

FIG. 4(a) is a block diagram illustrating an image coding apparatus 1000 as hardware performing the coding process according to the first embodiment.

The image coding apparatus 1000 includes an encoder 1110 for coding an input image signal Sg to generate coded image data Cgn; a decision unit 1131 for deciding whether the frame display cycle of the input image signal Sg is fixed or not, i.e., fixed or variable, and outputting a display cycle identifier Df indicating whether the display cycle is fixed or not; and a display cycle data generator (first data generator) 1132 for generating display cycle data Df indicating a fixed frame display cycle T, based on the input image signal Sg.

Further, the image coding apparatus 1000 includes a number data generator (second data generator) 1133 for generating frame number data Bn indicating the number of each frame in the transmission order (frame number B(n)), based on the input image signal Sg; and a display time data generator (third data generator) 1134 for generating display time data Dtn indicating the display time h(n) of each frame F(n), based on the input image signal Sg.

Furthermore, the image coding apparatus 1000 includes an ON/OFF switch 1141 for switching the circuit between the ON state where the display cycle data Dp from the data generator 1132 is transmitted and the OFF state where the display cycle data Dp is cut off, based on the display cycle identifier Df from the decision unit 1131; and a selector switch 1142 for selecting one of the frame number data Bn from the data generator 1133 and the display time data Dtn from the data generator 1134, based on the display cycle identifier Df from the decision unit 1131.

Moreover, the image coding apparatus 1000 includes a multiplexer (MUX) 1120 for multiplexing the display cycle identifier Df from the decision unit 1131, the coded data Cgn from the encoder 1110, the display cycle data Dp from the ON/OFF switch 1141, and the output from the selector switch 1142, to generate a multiplexed bit stream M1. The multiplexer 1120 outputs the multiplexed bit stream M1 as the coded image signal 100a having a fixed frame display cycle or the coded image signal 100b having a variable frame display cycle.

The operation of the image coding apparatus 1000 will be described briefly.

When an image signal Sg corresponding to a specific image is input to the apparatus 1000, the decision unit 1131 decides whether the frame display cycle of the image signal Sg is variable or not, and outputs the display cycle identifier Df indicating the result of the decision. Meanwhile, the first to third data generators 1132~1134 generate the display cycle data Dp, the frame number data Bn, and the display time data Dtn, respectively, based on the image signal Sg, and the encoder 1110 encodes the image signal Sg and outputs coded image data Cgn.

The display cycle identifier Df and the coded image data Cgn are output toward the multiplexer 1120. The display cycle data Dp is transmitted through the ON/OFF switch 1141, which is turned on or off according to the display cycle identifier Df, toward the multiplexer 1120. The frame number data Bn and the display time data Dtn are transmitted through the selector switch 1142, which selects one of the data Bn and the data Dtn according to the display cycle identifier Df, toward the multiplexer 1120.

That is, when an image signal having a fixed cycle of image display for each frame F(n) is input as the image signal Sg, the following data are output toward the multiplexer 1120: the fixed display cycle identifier Df, the display cycle data Dp indicating the cycle of image display of the respective frames, and the frame number data Bn corresponding to the respective frames and indicating the positional relations of the respective frames. In the multiplexer 1120, the coded image data Cgn, the fixed display cycle identifier Df, the display cycle data Dp, and the frame number data Bn are multiplexed and output as the coded image signal 100a.

On the other hand, when an image signal having a variable cycle of image display of the respective frames F(n) is input as the image signal Sg, the following data are output toward the multiplexer 1120: the variable display cycle identifier Df, and the display time data Dtn indicating the timing at which image display of each frame is carried out, i.e., the display time h(n), which is set relatively to a desired one of plural reference times according to each frame. In the multiplexer 1120, the coded image data Cgn, the variable display cycle identifier Df, and the display time data Dtn are multiplexed and output as the coded image signal 110b.

Next, the process of decoding the coded image signals 100a and 100b will be described using FIG. 5.

Initially, the display cycle identifier Df in the multiplexed bit stream M1 sent from the coding end (one of the coded image signals 100a and 100b) is detected to decide whether the display cycle of the coded image signal is fixed or not (step S21). When the result of the decision is that the display cycle is fixed, the count value n corresponding to the number of each frame F(n) in the transmission order is set to 0 (step S21a) and, thereafter, the display cycle data Dp indicating the display cycle T is read from the header of the coded image signal (step S22a).

Next, the frame number data Bn indicating the frame number B(n) is read from the header of each frame (step S23a), and the display time h(n) of each frame is calculated by h(n)=B(n)×T (step S24a).

Then, the coded image data Cgn corresponding to the frame F(n) is decoded, and the decoded image data corresponding to the frame F(n) is regarded as data to be displayed at the display time h(n) (step S25a). Thereafter, it is decided whether or not the frame F(n) being processed (object frame) is the last frame of the specific image in the transmission order (step S26a). When the object frame is the last frame, the decoding process is completed. When the object frame is not the last frame, the count value n is incremented by 1 (step S27a) and, thereafter, the above-described steps S23a~S26a are repeated until it is decided in step S26a that the object frame is the last frame.

On the other hand, when it is decided in step S21 that the display cycle is variable, the count value n, which corresponds to the number n of each frame F(n) in the transmission order, is set at 0 (step S21b) and, thereafter, the display time data Dtn indicating the display time h(n) of the frame F(n) is read from the header of each frame (step S22b), and the display time h(n) of the frame F(n) is decided according to the display time data Dtn (step S23b). Subsequently, the coded image data Cgn corresponding to the frame F(n) is decoded, and the decoded image data of the frame F(n) is regarded as data to be displayed at the display time h(n) (step S24b).

Thereafter, it is decided whether or not the frame F(n) being processed (object frame) is the last frame of the specific image in the transmission order (step S25b). When the object frame is the last frame, the decoding process is completed. When the object frame is not the last frame, the count value n is incremented by 1 (step S26b). Thereafter, the above-described steps S23a~S26a are repeated until it is decided in step S25b that the object frame is the last frame.

Figure 5:
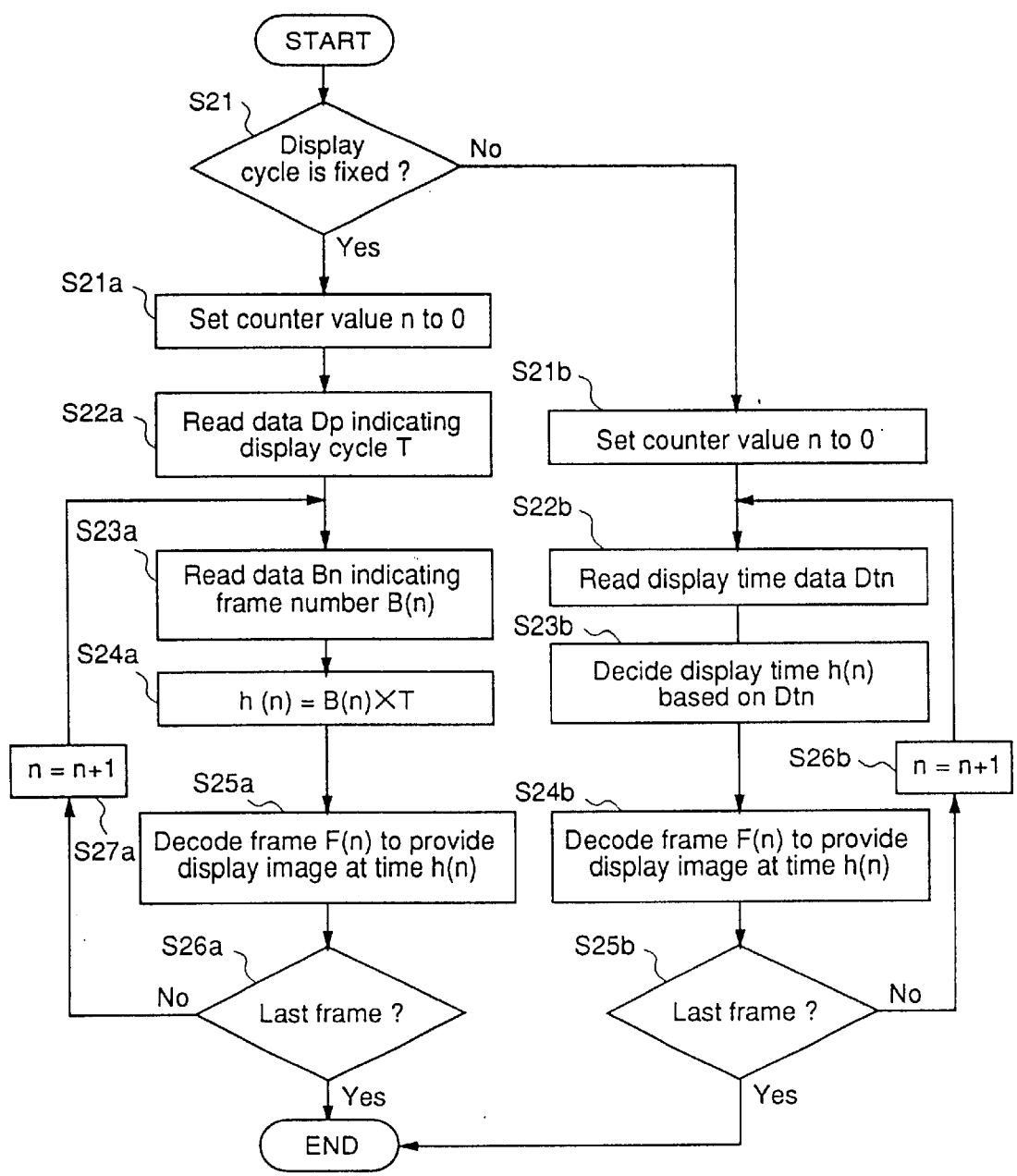
FIG. 5 is a flowchart of a decoding process for decoding the coded image signals having the data structures according to the first embodiment.

As described above, the coded image signals having the data structures shown in FIGS. 1(a) and 1(b) are decoded in the procedure shown in FIG. 5.

Figure 6:
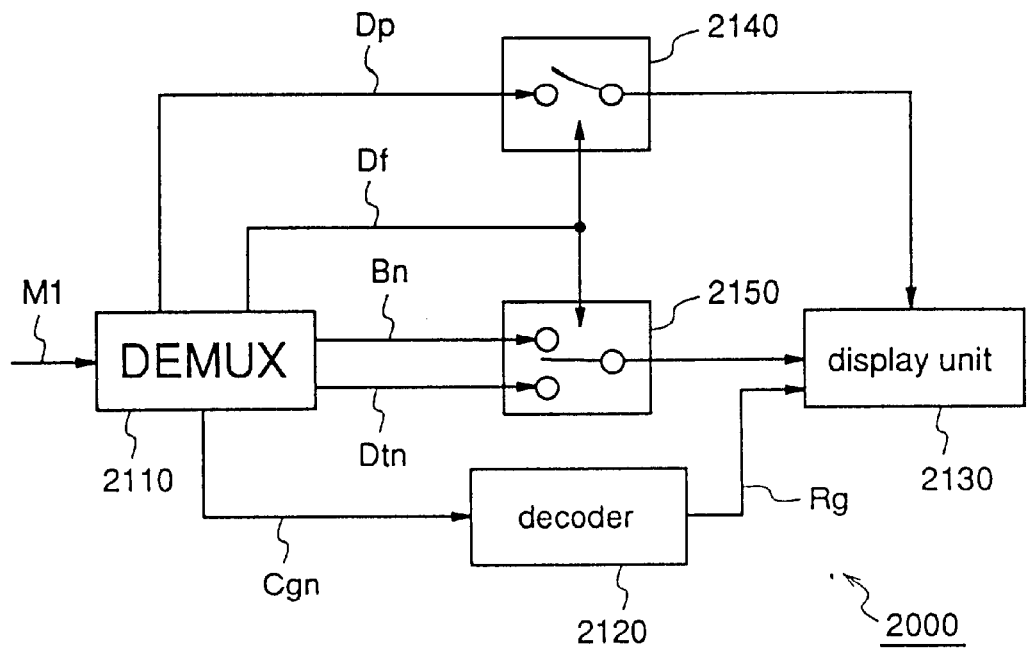
FIGS. 6(a) and 6(b) are block diagrams illustrating the structures of image decoding apparatuses according to the first embodiment and the modification thereof, respectively.
Figure 6:
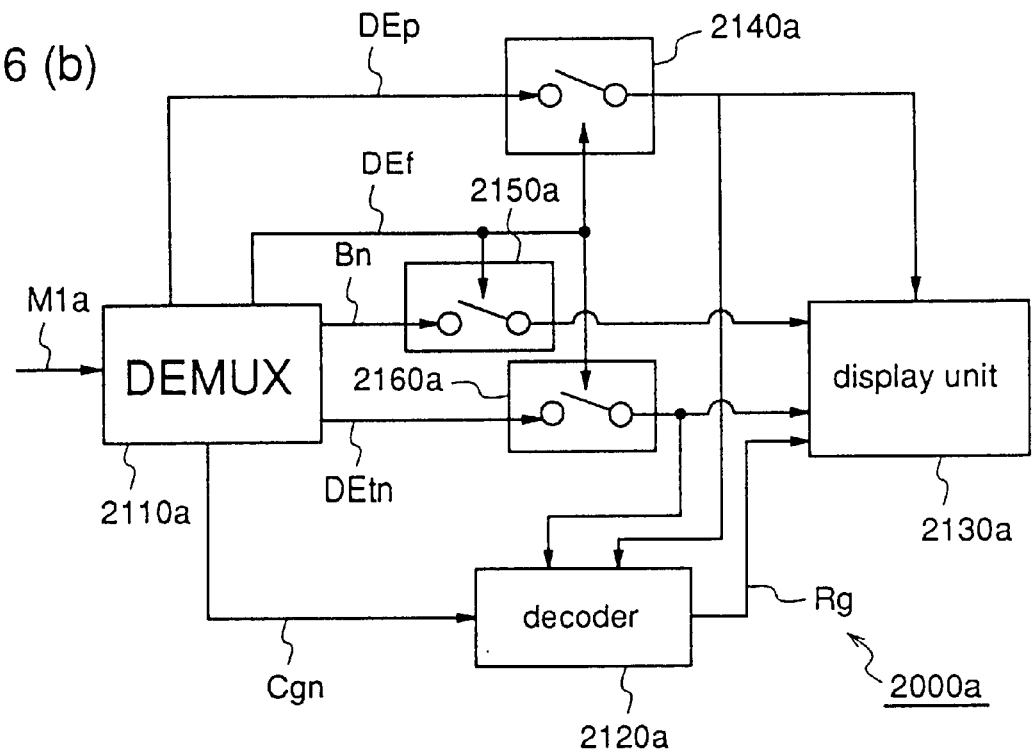

FIG. 6(a) is a block diagram illustrating the structure of an image decoding apparatus as hardware performing the decoding process according to the first embodiment.

The image decoding apparatus 2000 receives the multiplexed bit stream M1 (the coded image signal 100a or 100b) output from the image coding apparatus 1000, and subjects the multiplexed bit stream M1 to reproduction including decoding and display.

More specifically, the image decoding apparatus 2000 includes a demultiplexer (DEMUX) 2110 for extracting, from the multiplexed bit stream M1, the coded image data Cgn, the display cycle identifier Df, the display cycle data Dp, and the frame number data Bn or the display time data Dtn, and outputting these data; and a decoder 2120 for decoding the coded image data Cgn and outputting decoded image data Rg.

Further, the image decoding apparatus 2000 includes an ON/OFF switch 2140 for switching the circuit between the ON state where the display cycle data Dp is transmitted and the OFF state where the display cycle data Dp is cut off; and a selector switch 2150 for selecting one of the frame number data Bn and the display time data Dtn, based on the display cycle identifier Df, and outputting the selected data.

Furthermore, the image decoding apparatus 2000 includes a display unit 2130 for displaying the decoded image data Rg at a prescribed timing based on the display cycle identifier Df and the outputs from the switches 2140 and 2150.

Hereinafter, the operation of the image decoding apparatus 2000 will be briefly described.

When the multiplexed bit stream M1 from the image coding apparatus 1000 is input to the image decoding apparatus 2000, in the demultiplexer 2110, the display cycle identifier Df and the display cycle data Dp are separated from the multiplexed bit stream M1. Further, the coded image data Cgn and the frame number data Bn or the display time data Dtn are separated for each frame from the multiplexed bit stream M1.

The coded image data Cgn of each frame is decoded by the decoder 2120 and then output as decoded image data Rg toward the display unit 2130. The display cycle data Dp is transmitted through the ON/OFF switch 2140 which is turned on or off by the display cycle identifier Df toward the display unit 2130, and the frame number data Bn or the display time data Dtn of each frame is transmitted through the selector switch 2150, which selects one of these data according to the display cycle identifier Df, toward the display unit 2130.

In the display unit 2130, the image of each frame corresponding to the decoded image data Rg having a fixed display cycle is displayed at a prescribed display timing based on the display cycle data Dp and the frame number data Bn, while the image of each frame corresponding to the decoded image data Rg having a variable display cycle is displayed at a prescribed display timing based on the display time data Dtn.

As described above, in the image signal data structure according to the first embodiment, since the coded image signal obtained by coding an image signal includes the display cycle identifier Df indicating whether the cycle of image display for each frame is variable or not, when the cycle of image display for each frame is fixed, the decoded image data Rg can be displayed by a simple circuit structure, i.e., based on the display cycle data Dp and the frame number data Bn having a relatively small data quantity (bit number), without referring to the display time data (display timing data) Dtn having a relatively large data quantity (bit number) for each frame.

Further, since the coded image signal 100*a* having a fixed display cycle includes the display cycle data Dp indicating the image display cycle T and the data (frame position data) Bn indicating the frame number B(n) which indicates the positional relationship of the frame with the previous and subsequent frames, the image display timing of each frame can be decided by a simple calculation, TXB(n).

Furthermore, the coded image signal 100*b* having a variable display cycle includes the display time data (display timing data) Dtn indicating the display time (display timing) h(n) at which the image of each frame is to be displayed, which display time is set relatively to a desired time h'(0) among plural reference times, according to each frame (refer to FIG. 2). Therefore, when the cycle of image display of each frame is variable, like the conventional data structure, the image display timing h(n) of each frame F(n) can be set based on the display time data Dtn.

Furthermore, the image coding apparatus 1000 according to this first embodiment includes the decision unit 1131 for generating the display cycle identifier Df which indicates whether the image display cycle is variable or fixed, based on the input image signal. When the input image signal has a fixed display cycle, the coded image data Cgn is multiplexed with the display cycle identifier Df, the display cycle data Dp indicating the cycle of image display, and the frame number data Bn indicating the positional relationship of each frame with the previous and subsequent frames, and the data so multiplexed are output. When the input image signal has a variable display cycle, the coded image data Cgn is multiplexed with the display cycle identifier Df and the display time data Dtn indicating the display time h(n) of each frame F(n), and the data so multiplexed are output. Therefore, whether the cycle of image display for each frame is variable or fixed, the data for deciding the display timing of each frame is output together with the coded image data Cgn. Therefore, the number of bits required for deciding the display time can be reduced when the frame display cycle is fixed. Further, the image having a variable frame display cycle can be displayed in the same manner as the conventional display.

The image decoding apparatus 2000 according to this first embodiment includes the demultiplexer 2110 which separates the display cycle identifier Df, the display cycle data Dp indicating the cycle of image display, the frame number data Bn indicating the positional relationship of each frame, the display time data Dtn indicating the display time h(n) of each frame, and the coded image data Cgn, from the multiplexed bit stream M1 transmitted from the image coding apparatus 1000. Further, the apparatus 2000 includes the decoder 2120 which decodes the coded image data Cgn and outputs the decoded image data Rg. In this apparatus, the decoded image data Rg having a fixed display cycle is displayed at a prescribed display timing based on the display cycle data Dp and the frame number data Bn, while the decoded image data Rg having a variable display cycle is displayed at a prescribed display timing based on the display time data Dtn. Therefore, whether the frame display cycle of the decoded image data Rg is variable or fixed, the decoded image data Rg of each frame can be displayed at an accurate display timing.

In the image data structure according to the first embodiment, the display cycle identifier Df is inserted at the beginning of the image data (multiplexed bit stream), and the frame number data Bn or the display time data Dtn is inserted at the beginning of each frame data (code sequence of each frame). However, the display cycle identifier, the frame number data, and the display time data are not necessarily inserted at the beginning of the corresponding headers. These data may be inserted after synchronous signals or the like as along as the display cycle identifier and the display cycle data are included in the header of the image data (coded image signal) while the frame number data and the display time data are included in the header of the data (code sequence) corresponding to the frame.

While in this first embodiment the display cycle data Dp is inserted just after and next to the display cycle identifier Df, the display cycle data Dp may be inserted in any place after the display cycle identifier Df within the header of the image data.

Further, while in this first embodiment serial numbers are given, as the numbers n'(=B(n)) indicating the display order, from the beginning of the image data in the display order as shown in FIG. 2, it is not always necessary to give such serial numbers. A plurality of numbers from the first number to the last number, which have been determined in advance, may be given periodically as the frame numbers.

For example, when the frame numbers are expressed with 4 bits, numbers from 0 to 15 are periodically given to the frames. In this case, the display time is expressed by $$h'(n')=hp'(15)+(n'+1)\times T$$

where hp'(n') indicates the display time corresponding to the frame number B(n) (=n') in the previous period. Accordingly, h'(n') indicates the display time corresponding to the frame number B(n) (=n') in the cycle next to hp'(n'). In the formula, hp'(15) indicates the display time of the last frame in the previous period.

Furthermore, while in this first embodiment each frame is specified by using the frame number data, any data may be used as long as it specifies the positional relationship of each frame with the previous and subsequent frames, for example, data indicating the positional relationships of the respective frames according to a specific rule or data specifying the positional relationships of the respective frames with reference to a prescribed table.

Moreover, in this first embodiment, the display time data indicates the time relative to plural reference times, and one reference time may be set for plural frames or the display time of the previous frame may be used as the reference time. Further, plural reference times may be set in advance, and which reference time is to be used for expressing the frame display time may be decided according to some rule or signal.

Further, the data structure of the coded image signal according to this first embodiment includes the display cycle identifier, the display cycle data, and the frame number data or the display time data, these data being used for setting the display timing of each frame, as the additional data for deciding the reproduction timing of each frame at the decoding end. However, instead of those additional data for deciding the display timing of each frame, the data structure of the coded image signal may includes additional data for deciding the decoding timing of each frame, namely, decoding cycle identifier, decoding cycle data, and frame number data or decoding time data. Hereinafter, such data structure will be described as a modification of the first embodiment.

(Modification of Embodiment 1)

In the data structure according to the modification of the first embodiment, the display cycle identifier Df and the display cycle data Dp in the coded image signal 100a of the first embodiment are replaced with a decoding cycle identifier and decoding cycle data, and the display time data Dtn in the coded image signal 100b of the first embodiment is replaced with decoding time data.

The decoding cycle identifier indicates whether the cycle of a decoding process for decoding a coded image signal of each frame is variable or not, and a fixed decoding cycle identifier is inserted in a coded image signal having a fixed decoding cycle while a variable decoding cycle identifier is inserted in a coded image signal having a variable decoding cycle.

Further, the decoding cycle data indicates the cycle DT of decoding each frame, and the decoding time data indicates the timing at which decoding of each frame is carried out (decoding time Dh(n)), which timing is set relatively to a desired one of plural reference times according to each frame.

The coding process for generating the coded image signal having the data structure according to this modification of the first embodiment is realized by replacing steps S11, S11a, S11b, S13a and S13b in the flow of FIG. 3 as follows.

That is, the process of deciding the display cycle in step S11 is replaced with deciding whether the decoding cycle is fixed or not; the process of adding the fixed display cycle identifier Df in step S11a is replaced with the process of adding the fixed decoding cycle identifier; and the process of adding the variable display cycle identifier Df in step S11b is replaced with the process of adding the variable decoding cycle identifier. Further, the process of adding the display cycle data Dp in step S13a is replaced with the process of adding the decoding cycle data; and the process of adding the display time data Dtn in step S13b is replaced with the process of adding the decoding time data.

FIG. 4(b) shows the structure of an image coding apparatus 1000a as hardware for performing the coding process according to the modification of the first embodiment.

The image coding apparatus 1000a includes a decision unit 1131a for deciding whether the frame decoding cycle of the input image signal Sg is fixed or not, i.e., fixed or variable, and outputting a decoding cycle identifier DEf indicating whether the decoding cycle DT is fixed or not, in place of the decision unit 1131 of the image coding apparatus 1000 of the first embodiment.

Further, the image coding apparatus 1000a includes a decoding cycle data generator (first data generator) 1132a which generates decoding cycle data DEp indicating the frame decoding cycle (fixed cycle) DT, based on the input image signal Sg, and a decoding time data generator (third data generator) 1134a which generates decoding time data DEtn indicating the decoding time of each frame, based on the input image signal Sg, in place of the display cycle data generator 1132 and the display time generator 1134 of the image coding apparatus 1000.

Other constituents are identical to those of the image coding apparatus 1000 of the first embodiment.

In the image coding apparatus 1000a so constructed, the multiplexer (MUX) 1120 multiplexes the decoding cycle identifier DEf from the decision unit 1131a, the coded image data Cgn from the encoder 1110, the decoding cycle data $DE_p$ from the ON/OFF switch 1141, and the output from the selector switch 1142, and outputs a multiplexed bit stream M1a as a coded image signal having a fixed decoding cycle or a coded image signal having a variable decoding cycle.

On the other hand, the process for decoding the coded image signal having the data structure according to this modification of the first embodiment is realized by replacing steps S21, S22a, S22b, S23a, S23b, S24a, S24b and S25a in the flow of FIG. 5 as follows.

That is, the process of deciding the display cycle in step S21 is replaced with the process of deciding whether the decoding cycle is fixed or not; the process of reading the display cycle data Dp indicating the display cycle T in step S22a is replaced with the process of reading the decoding cycle data DEp indicating te decoding cycle Dt; and the process of reading the display time data Dtn indicating the display time h(n) in step S22b is replaced with the process of reading the decoding time data DEtn indicating the decoding time Dh(n).

Further, the process of deciding the display time h(n) by reading the frame number data Bn in steps S23a and S24a is replaced with the process of deciding the decoding time Dh(n) of coded image data of each frame based on the decoding cycle data DEp and then deciding the display time h(n) of each frame based on the frame number data Bn.

Further, the process of deciding the display time h(n) based on the display time data Dtn in step S23b is replaced with the process of deciding the decoding time Dh(n) based on the decoding time data DEtn and then deciding the display time h(n) based on the data DEtn.

Furthermore, the process of decoding the coded image data Cgn of the frame F(n) and displaying it at the display time h(n) in step S25a is replaced with the process of decoding the coded image data Cgn of the frame F(n) at the decoding time Dh(n) and displaying it at the display time h(n); and the process of decoding the coded image data Cgn of the frame F(n) and displaying it at the time h(n) in step S24b is replaced with the process of decoding the coded image data Cgn of the frame F(n) at the decoding time Dh(n) and displaying it at the display time h(n).

FIG. 6(b) is a block diagram illustrating the structure of an image decoding apparatus 2000a as hardware performing the decoding process according to the modification of the first embodiment.

The image decoding apparatus 2000a receives the multiplexed bit stream M1a output from the image coding apparatus 1000a, and subjects the multiplexed bit stream M1a to reproduction including decoding and display.

More specifically, the image decoding apparatus 2000a includes a demultiplexer (DEMUX) 2110a for extracting, from the multiplexed bit stream M1a, the coded image data Cgn, the decoding cycle identifier DEf, the decoding cycle data DEp, and the frame number data Bn or the decoding time data DEtn, and outputting these data, in place of the demultiplexer 2110 of the image decoding apparatus 2000 of the first embodiment.

Further, the image decoding apparatus 2000a includes a first ON/OFF switch 2140a for switching the circuit between the ON state where the decoding cycle data DEp is transmitted and the OFF state where the decoding cycle data DEp is cut off, based on the decoding cycle identifier DEf; a second ON/OFF switch 2150a for switching the circuit between the ON state where the frame number data Bn is transmitted and the OFF state where the frame number data Bn is cut off, based on the decoding cycle identifier DEf; and a third ON/OFF switch 2160a for switching the circuit between the ON state where the decoding time data DEtn is transmitted and the OFF state where the decoding time data DEtn is cut off, based on the decoding cycle identifier DEf.

In the image decoding apparatus 2000a, the decoding cycle data DEp output from the first ON/OFF switch 2140a and the decoding time data DEtn output from the third ON/OFF switch 2160a are supplied to the decoder 2120a and the display unit 2130a, while the frame number data Bn output from the second ON/OFF switch 2150a is supplied to the display unit 2130a.

In the decoder 2120a, the coded image data Cgn having a fixed decoding cycle is decoded frame by frame at the timing (decoding time Dh(n)) decided by the decoding cycle data DEp, while the coded image data Cgn having a variable decoding cycle is decoded frame by frame at the timing (decoding time Dh(n)) decided by the decoding time data DEtn.

Further, in the display unit 2130a, the decoded image data Rg having a fixed decoding cycle is displayed frame by frame at the timing (display time h(n)) decided by the decoding cycle data DEp and the frame number data Bn, while the decoded image data Rg having a variable decoding cycle is displayed frame by frame at the timing (display time h(n)) decided by the decoding time data DEtn.

Other constituents of the image decoding apparatus 2000a are identical to those of the image decoding apparatus 2000 of the first embodiment.

Hereinafter, the operation of the image decoding apparatus 2000a will be described briefly.

When the multiplexed bit stream M1a is input to the apparatus 2000a, in the demultiplexer 2110a, the coded image data Cgn, the decoding cycle identifier DEf, the decoding cycle data DEp, and the frame number data Bn or the decoding time data DEtn are separated from the input bit stream M1a.

In the decoder 2120a, when the decoding cycle of the input coded image signal is fixed, the coded image data Cgn is decoded frame by frame at the timing (decoding time Dh(n)) decided by the decoding cycle data DEp. Then, the decoded image data Rg output from the decoder 2120a is displayed frame by frame at the timing (display time h(n)) decided by the decoding cycle data DEp and the frame number data Bn.

On the other hand, when the decoding cycle of the input coded image signal is variable, the coded image data Cgn is decoded frame by frame at the timing (decoding time Dh(n)) decided by the decoding time data DEtn. Then, the decoded image data Rg output from the decoder 2120a is displayed frame by frame at the timing (display time h(n)) decided by the decoding time data DEtn.

In the modification of the first embodiment, as in the first embodiment, since the coded image signal obtained by coding an image signal includes the decoding cycle identifier DEf indicating whether the cycle of image decoding for each frame is variable or not, when the cycle of image decoding for each frame is fixed, the coded image data can be decoded by a simple circuit structure, that is, it can be decoded according to the decoding cycle data DEp alone, without referring to the decoding time data DEtn having a large data quantity (bit number) for each frame.

In the modification of the first embodiment, emphasis has been placed on an image decoding apparatus which performs image display of each frame as well as decoding of each frame according to data for deciding the decoding timing of each frame, which data is included in the coded image signal. However, an image decoding apparatus which performs decoding of each frame as well as image display of each frame according to data for deciding the display timing of each frame, which data is included in a coded image signal, is also within the scope of the present invention.

In this case, the decoding timing at which decoding of each frame is carried out is set according to display timing data of plural frames including an object frame to be decoded. That is, based on the display timing data of the object frame and the display timing data of the next frame transmitted subsequently to the object frame, the decoding timing of the object frame is set at a timing that is earlier, by a prescribed offset time, than the earlier display timing between the display timings of the object frame and the next frame.

To be specific, when the display timing of the object frame is earlier than the display timing of the next frame transmitted subsequently to the object frame, the offset time is set to a length longer than the time required for decoding the object frame. On the other hand, when the display timing of the next frame (for example, B-VOP) transmitted subsequently to the object frame (for example, P-VOP) is earlier than the display timing of the object frame, the offset time is set to a length longer than the sum of the time required for decoding the object frame and the time required for decoding the next frame.

[Embodiment 2]

Figure 7:
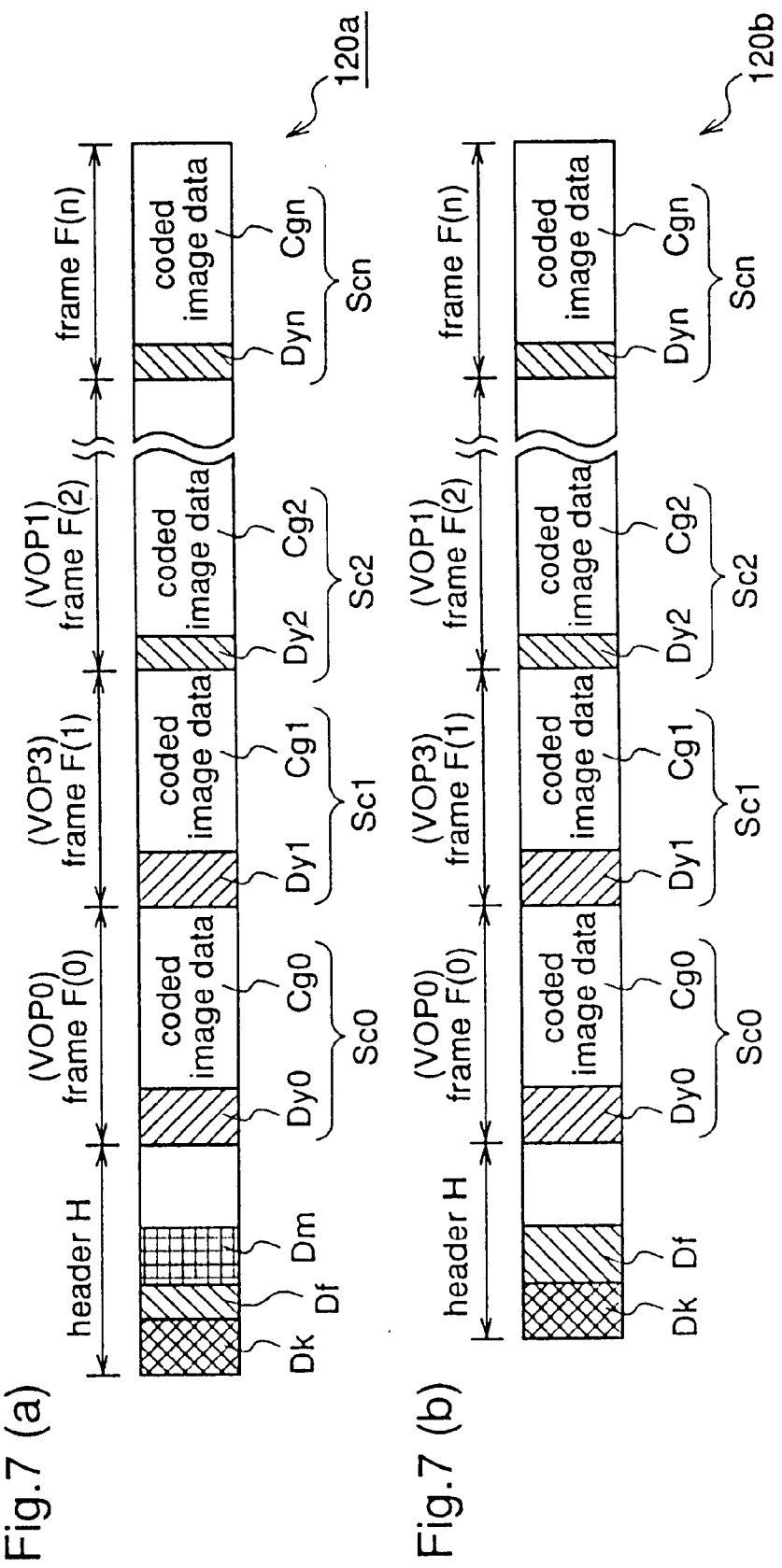
FIGS. 7(a) and 7(b) are diagrams illustrating the data structure of a coded image signal based on MPEG4 and having a fixed frame display cycle, and the data structure of a coded image signal based on MPEG4 and having a variable frame display cycle, respectively, according to a second embodiment of the present invention.

FIG. 7(a) shows a data structure of a coded image signal 120a having a fixed frame display cycle, according to a second embodiment of the present invention.

The coded image signal 120a is obtained by coding an image signal which corresponds to one image (in MPEG4, an image corresponding to one object) and has a fixed frame display cycle. The coded image signal 120a has a header H at the beginning, and the header H is followed by code sequences Sc0, Sc1, Sc2, . . . , Scn corresponding to frames F(0), F(1), F(2), . . . , F(n), respectively, which code sequences are arranged in the transmission order. In the coded image signal 120a, the following data are included in the header H: a display cycle identifier Df indicating whether the frame display cycle is fixed or not; display cycle multiplier data Dm indicating that the frame display cycle is the sub-unit time (1/N) multiplied by M (natural number) by the multiplier M, i.e., how many times (M) the frame display cycle is as long as the sub-unit time (1/N); and sub-unit time data Dk indicating the value N (natural number) for obtaining the sub-unit time (1/N). Further, at the beginnings of the code sequences Sc0, Sc1, Sc2, . . . , Scn of the respective frames, display time data Dy0, Dy1, Dy2, . . . , Dyn indicating the display times y'0, y'3, y'1, .. , y'n' of the respective frames (refer to FIG. 17(a)) are inserted. In the header H of the coded image signal 120a, the sub-unit time data Dk, the display cycle identifier Df, and the display cycle multiplier data Dm are arranged so that these data are transmitted in this order.

In the code sequences Sc0, Sc1 , Sc2, . . . , Scn of the respective frames, the display time data Dy0, Dy1, Dy2, . . . , Dyn are followed by coded image data Cg0, Cg1, Cg2, . . . , Cgn, respectively.

Figure 17:
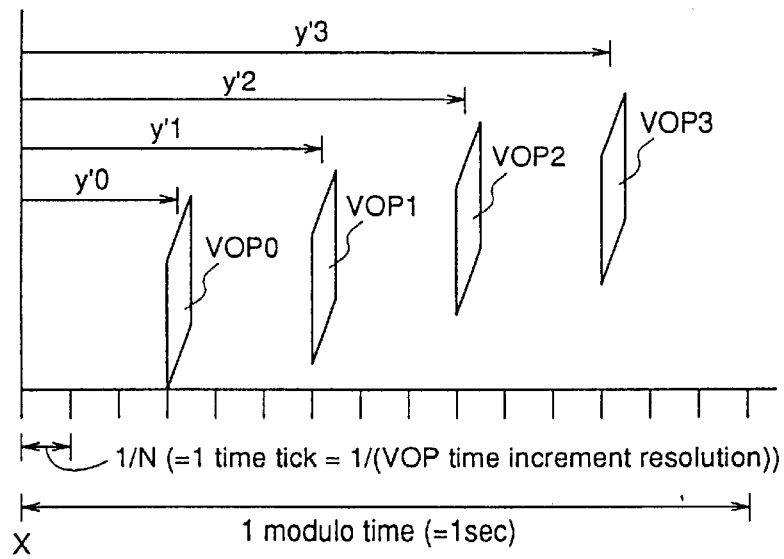
FIGS. 17(a) and 17(b) are diagrams for explaining a method for expressing display times of frames (VOPS) based on MPEG4.
FIG. 17(c) is a diagram for explaining the current data structure of a coded image signal based on MPEG4.
Figure 17:
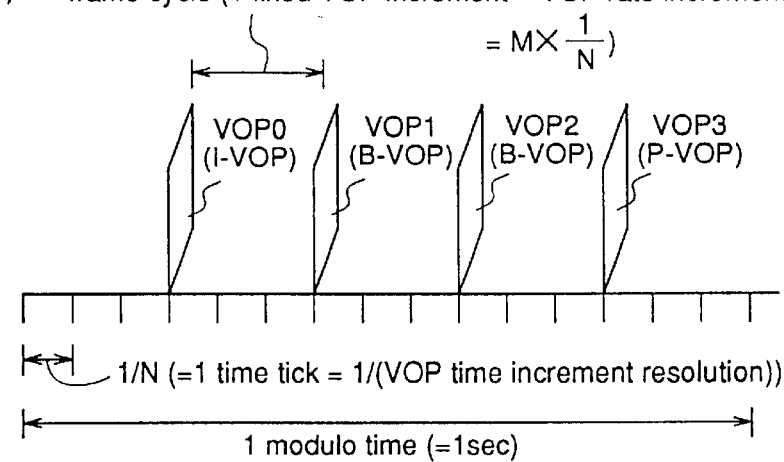
Figure 17:
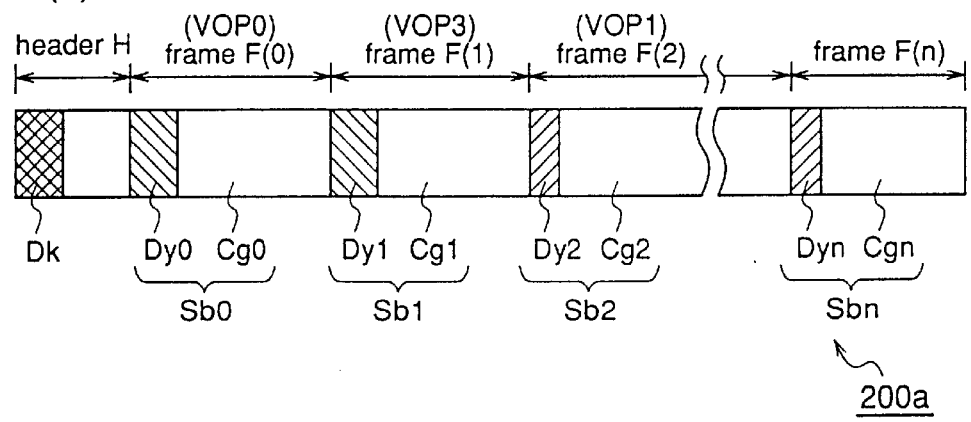

In this coded image signal 120a, assuming that the reference time is x (refer to FIG. 17(a)), the display times h(0), h(1), h(2), . . . of the frames F(0), F(1), F(2), . . . corresponding to the VOP0, VOP3, VOP1, . . . are expressed by x+y/N(y=y'0, y'3, y'1, . . . ) based on the display time data Dy0, Dy1, Dy2 . . .

However, since the coded image signal 120a includes the sub-unit time data Dk and the display cycle multiplier data Dm, image display of each frame can be carried out without using the display time data (Dy0, Dy1, Dy2, . . . ). To be specific, based on the sub-unit time (1/N) obtained from the sub-unit time data Dk and the value of M (natural number) obtained from the display cycle multiplier data Dm, the frame display cycle T (=M×1/N) is obtained, and the image of each frame is displayed at the original display time h(n) (=x+y×M×1/N) of each frame F(n), decided by the reference time x.

FIG. 7(b) illustrates the data structure of a coded image signal 120b having a variable frame display cycle, according to the second embodiment of the invention.

The coded image signal 120b is different from the coded image signal 120a in that the header H does not include the display cycle multiplier data Dm.

Hereinafter, a description is given of a coding process for generating the coded image signal 120a or 120b and a decoding process for decoding the coded image signal.

Figure 8:
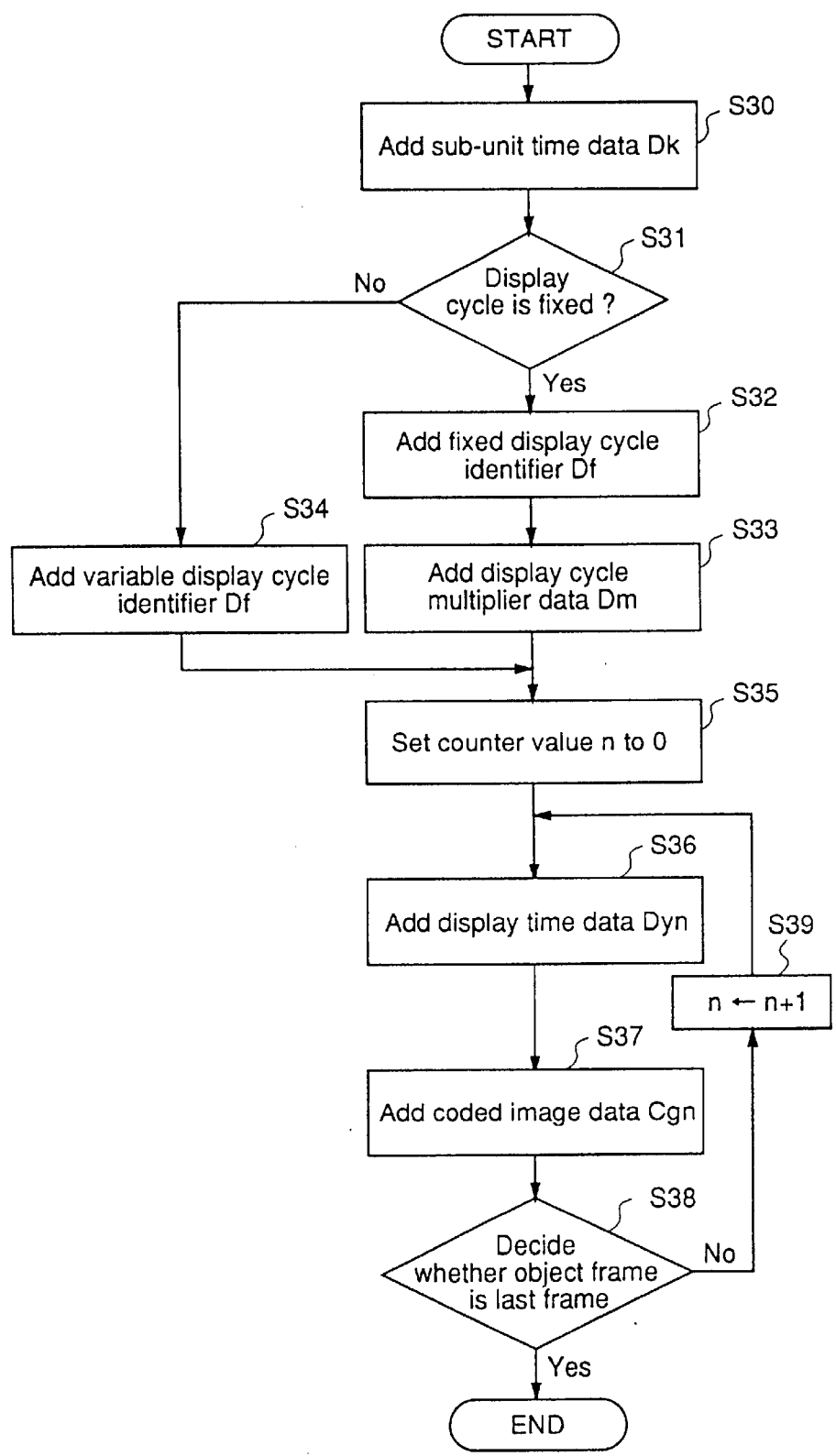
FIG. 8 is a flowchart of a coding process for generating the coded image signals having the data structures according to the second embodiment.

FIG. 8 is a flowchart of the coding process. In the coding process, initially, the sub-unit time data Dk is added to the header of the bit stream of the input image signal corresponding to a specific image (step S30), and it is decided whether the display cycle of the image signal is fixed or not (step S31). When the result of the decision is that the display cycle is fixed, a fixed display cycle identifier Df indicating that the display cycle of the image signal is fixed is added to the header of the bit stream so that it follows the sub-unit time data Dk (step S32) and, furthermore, the display cycle multiplier data Dm is added to the header so that it follows the fixed display cycle identifier Df (step S33).

Thereafter, the count value n, which corresponds to the number n indicating the transmission order of each frame F(n) as a constituent of the specific image, is set to 0 (step S35)., Next, as a code sequence Sa0 corresponding to the first frame F(0) of the specific image in the transmission order, display time data Dyn (=Dy0) and coded image data Cgn (=Cg0) of the frame are successively added to the header H (steps S36 and S37). Thereafter, it is decided whether or not the frame being processed (hereinafter, referred to as "object frame") in the image signal is the last frame of the specific image in the transmission order (step S38). When the object frame is not the last frame, the count value n corresponding to the frame F(n) (=F(0)), the transmission order of which is n-th, is incremented by 1 (step S39), and the following frame F(n+1) (=F(1)) is subjected to the processes of steps S36–S39.

The processes of steps S36–S39 are repeated until it is decided in step S38 that the object frame is the last frame. The coded image signal 120a is generated through the above-described process steps.

On the other hand, when the result of the decision in step S31 is that the display cycle is variable, a variable display cycle identifier Df indicating that the display cycle of the image signal is variable is added to the header H of the bit stream corresponding to the image signal so that it follows the sub-unit time data Dk (step S34). Thereafter, the processes of steps S35–S39 are carried out, thereby generating the coded image signal 120b.

Figure 9:
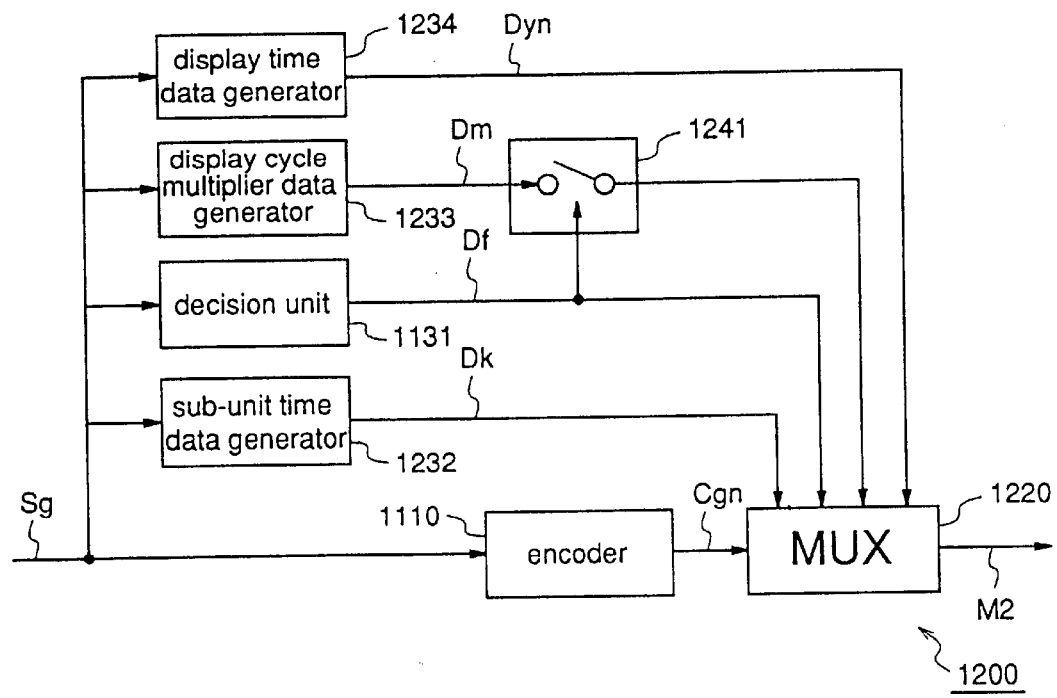
FIGS. 9(a) and 9(b) are block diagrams illustrating the structures of image coding apparatuses according to the second embodiment and a modification of the second embodiment, respectively.
Figure 9:
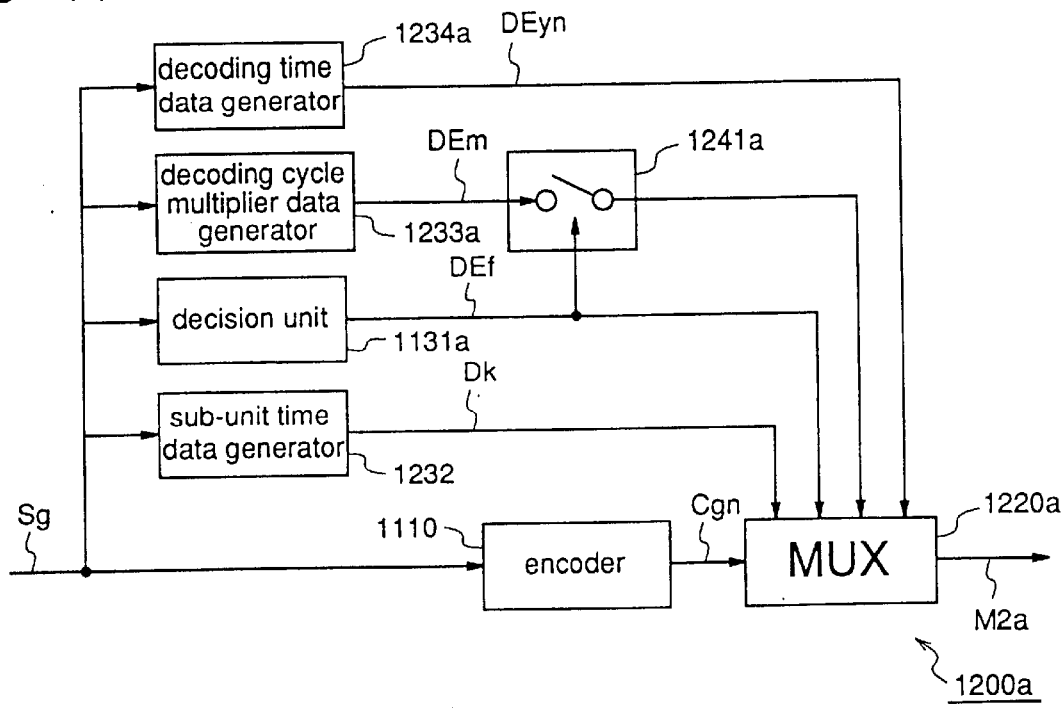

FIG. 9(a) is a block diagram illustrating an image coding apparatus 1200 as hardware performing the coding process according to the second embodiment.

The image coding apparatus 1200 includes an encoder 1110 for coding an input image signal Sg to generate coded image data cgn, and a decision unit 1131 for deciding whether the frame display cycle of the input image signal Sg is fixed or not, i.e., fixed or variable, and outputting a display cycle identifier Df indicating whether the display cycle is fixed or not.

Further, the image coding apparatus 1200 includes three data generators as follows: a sub-unit time data generator (first data generator) 1232 for generating sub-unit time data Dk based on the input image signal Sg; a display cycle multiplier data generator (second data generator) 1233 for generating display cycle multiplier data Dm which indicates a numeric value M for expressing the frame display cycle by a multiplier (M) for the sub-unit time, based on the input image signal Sg; and a display time data generator (third data generator) 1234 for generating display time data (display timing data) Dyn indicating the display time h(n) of each frame, based on the input image signal Sg.

Furthermore, the image coding apparatus 1200 includes an ON/OFF switch 1241 for switching the circuit between the ON state where the display cycle multiplier data Dm is transmitted and the OFF state where the display cycle multiplier data Dm is cut off, based on the display cycle identifier Df from the decision unit 1131.

The image coding apparatus 1200 further includes a multiplexer (MUX) 1220 for multiplexing the sub-unit time data Dk from the first data generator 1232, the display cycle identifier Df from the decision unit 1131, the display cycle multiplier data Dm from the switch 1241, the display time data Dyn from the third data generator 1234, and the coded image data Cgn from the encoder 1110, to generate a multiplexed bit stream M2. The multiplexer 1220 outputs the multiplexed bit stream M2 as the coded image signal 120a or the coded image signal 120b.

The operation of the image coding apparatus 1200 will be described briefly.

When an image signal Sg corresponding to a specific image is input to the apparatus 1200, the decision unit 1131 decides whether the display cycle of the image signal Sg is variable or not, and outputs the display cycle identifier Df indicating the result of the decision. Meanwhile, the first to third data generators 1232–1234 generate the sub-unit time data Dk, the display cycle multiplier data Dm, and the display time data Dyn, respectively, based on the image signal Sg, and the encoder 1110 encodes the image signal Sg and outputs coded image data Cgn.

The sub-unit time data Dk, the display cycle identifier Df, the display time data Dyn, and the coded image data Cgn are continually output toward the multiplexer 1220. The display cycle multiplier data Dm is transmitted through the switch 1241, which is in the ON state by the display cycle identifier Df, toward the multiplexer 1220.

That is, when an image signal having a fixed cycle of image display is input as the image signal Sg, the sub-unit time data Dk, the display cycle identifier Df, the display cycle multiplier data Dm, the display time data Dyn of each frame, and the coded image data Cgn of each frame are output to the multiplexer 1220. In the multiplexer 1220, the sub-unit time data Dk, the display cycle identifier Df, the display cycle multiplier data Dm, the coded image data Cgn, and the display time data Dyn are multiplexed, and the coded image signal 120a is output as the multiplexed bit stream M2.

On the other hand, when an image signal having a variable cycle of image display is input as the image signal Sg, the switch 1241 goes into the OFF state according to the display cycle identifier Df. In this state, the sub-unit time data Df, the display cycle identifier Df, the display time data Dyn of each frame, and the coded image data Cgn of each frame are output to the multiplexer 1220. In the multiplexer 1220, the sub-unit time data Df, the display cycle identifier Df, the display time data Dyn, and the coded image data Cgn are multiplexed, and the coded image signal 120b is output as the multiplexed bit stream M2.

Figure 10:
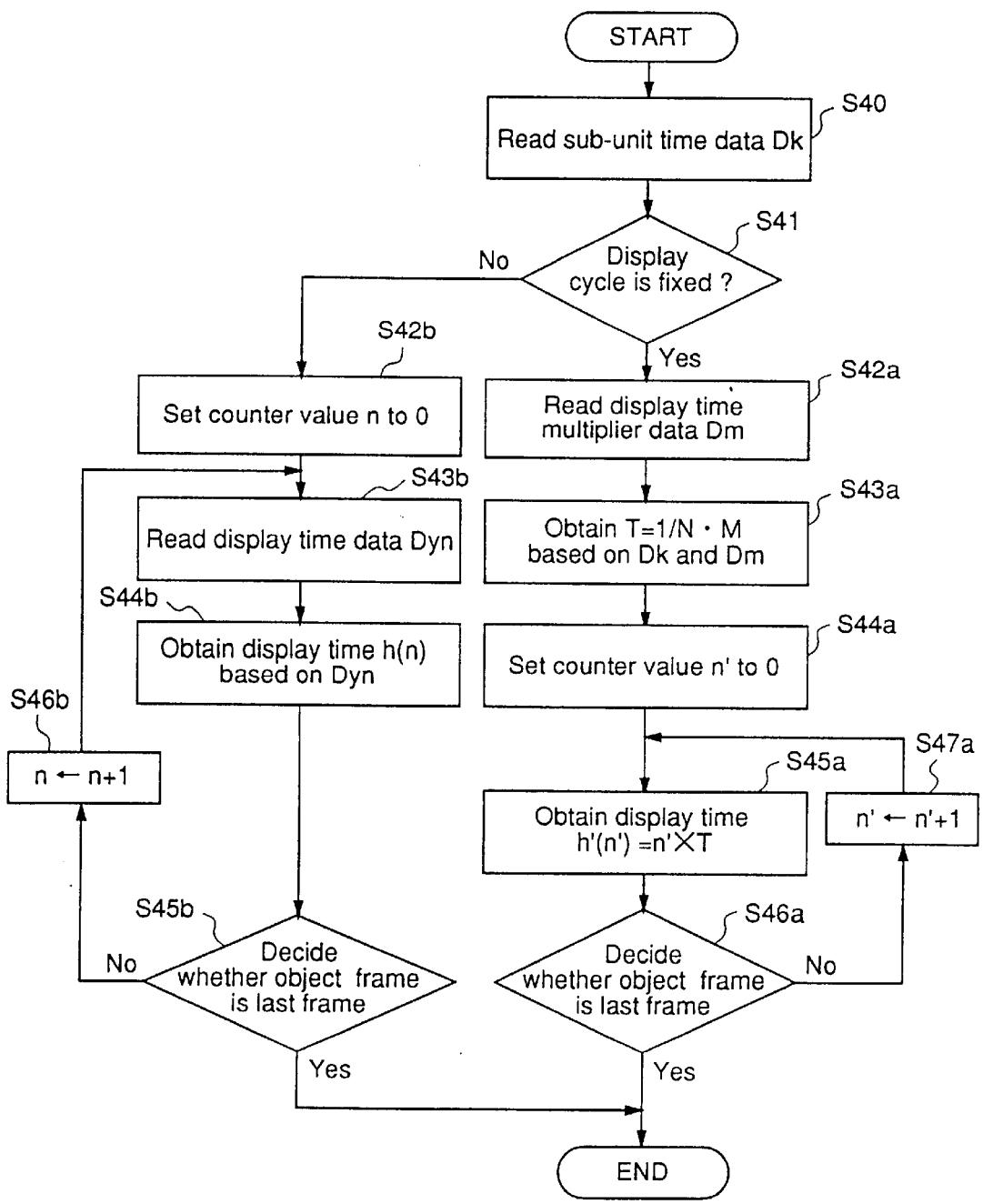
FIG. 10 is a flowchart of a decoding process for decoding the coded image signals having the data structures according to the second embodiment.

Next, a description is given of a decoding process for decoding a coded image signal having a data structure according to this second embodiment, with reference to FIG. 10.

FIG. 10 is a flowchart of the decoding process. In the decoding process, initially, the sub-unit time data Dk included in the multiplexed bit stream M2 (coded image signal 120a or 120b) sent from the coding end is read (step S40), and the display cycle identifier Df is detected to decide whether the display cycle of the coded image signal is fixed or not (step S41). When it is decided that the display cycle is fixed, the display cycle multiplier data Dm, which expresses the display cycle T by a multiplier M for the sub-unit time (1/N), is read from the header H of the coded image signal (step S42a). Subsequently, based on the sub-unit time data Dk and the display cycle multiplier data Dm, the frame display cycle T is obtained by T=(1/N)×M (step S43a). Thereafter, the count value n', which corresponds to the number n' of each frame F'(n') from the first frame in the display order, is set to 0 (step S44a), and the display time h'(n') of each frame F'(n') is obtained by h'(n')=n'×T (step S45a). At this time, the coded image data Cgn corresponding to each frame F(n) is decoded in the transmission order, generating decoded image data Rg corresponding to the frame F(n).

Thereafter, it is decided whether or not the object frame F'(n') counted in the display order is the last frame of the specific image (step S46a). When the object frame is the last frame, the decoding process is completed. When the object frame is not the last frame, the count value n' is incremented by 1 (step S47a), and the processes of steps S45a–S47a are repeated until it is decided in step S46a that the object frame is the last frame.

In the decoding process, the decoded image data Rg corresponding to each decoded frame F'(n') is displayed at the display time h'(n') in the prescribed display order n'.

On the other hand, when it is decided that the display cycle is variable in step S41, the count value n corresponding to the number n of each frame F(n) in the transmission order is set to 0 (step S42b). Subsequently, the display time data Dyn indicating the display time h(n) of each frame F(n) is read from the header H of the frame F(n) (step S43b), and the display time h(n) of each frame F(n) is obtained according to the display time data Dyn (step S44b). At this time, the coded image data Cgn of each frame F(n) is decoded in the transmission order.

Thereafter, it is decided whether or not the object frame F(n) counted in the transmission order is the last frame of the specific image (step S45b). When the object frame is the last frame, the decoding process is ended. When the object frame is not the last frame, the count value n is incremented by 1 (step S46b) and, thereafter, the processes of steps S42b~S46b are repeated until it is decided in step S45b that the object frame is the last frame.

In the decoding process, the decoded image data Rg corresponding to each decoded frame F(n) is displayed at the display time h(n) of the frame F(n) in the prescribed display order n'.

Figure 11:
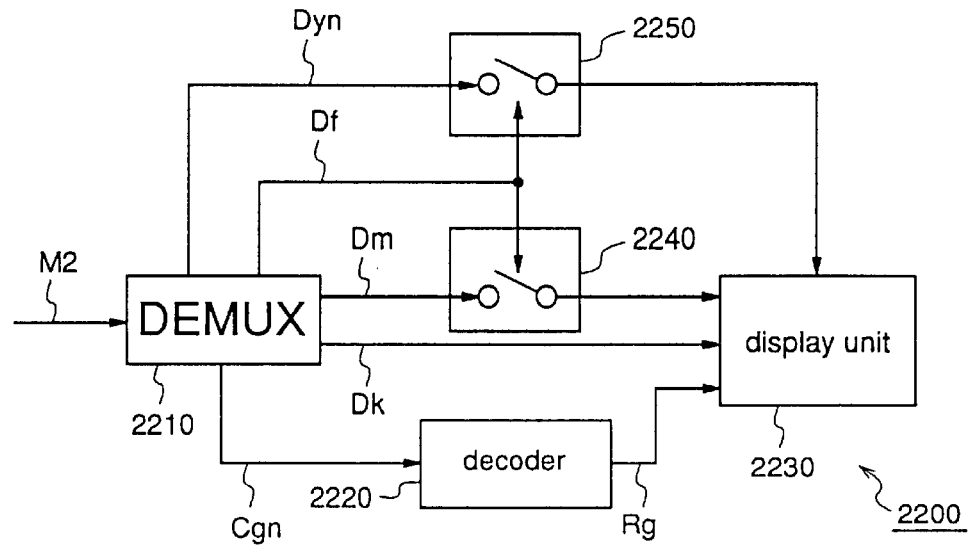
FIGS. 11(a) and 11(b) are block diagrams illustrating the structures of image decoding apparatuses according to the second embodiment and the modification thereof, respectively.
Figure 11:
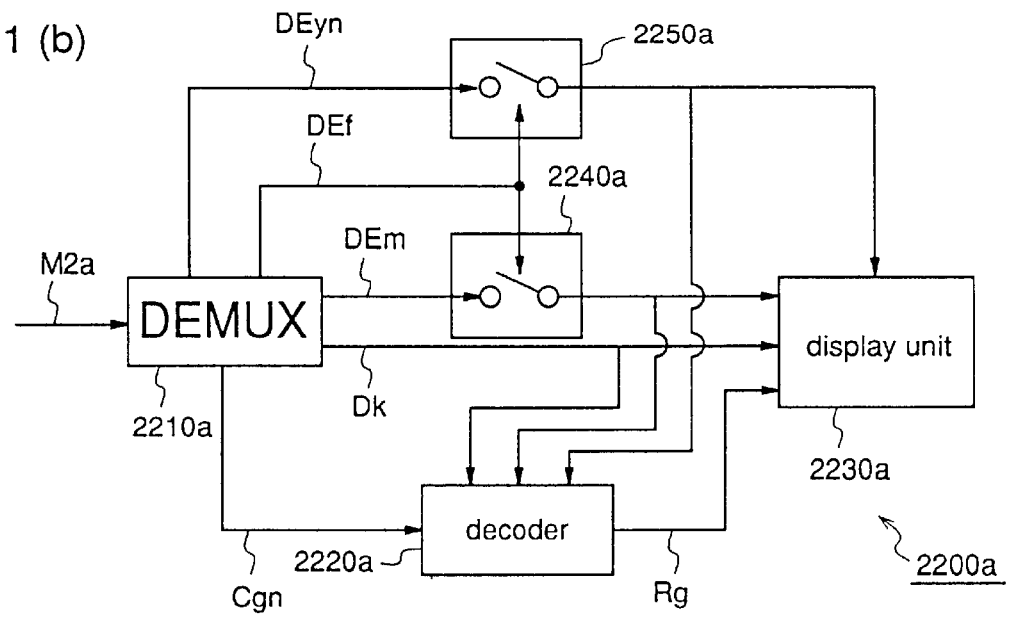

FIG. 11(a) is a block diagram illustrating the structure of an image decoding apparatus 2200 as hardware performing the decoding process of the second embodiment.

The image decoding apparatus 2200 decodes and reproduces the multiplexed bit stream M2 (the coded image signal 120a or 120b) output from the image coding apparatus 2000.

More specifically, the image decoding apparatus 2200 includes a demultiplexer (DEMUX) 2210 for extracting, from the multiplexed bit stream M2, the sub-unit time data Dk, the display cycle identifier Df, the display cycle multiplier data Dm, the display time data Dyn, and the coded image data Cgn, and outputting these data; and a decoder 2220 for decoding the coded image data Cgn and outputting decoded image data Rg.

Further, the image decoding apparatus 2200 includes a first ON/OFF switch 2240 for switching the circuit between the ON state where the display cycle multiplier data Dm is transmitted and the OFF state where the display cycle multiplier data Dm is cut off, according to the display cycle identifier Df; and a second ON/OFF switch 2250 for switching the circuit between the ON state where the display time data Dyn is transmitted and the OFF state where the display time data Dyn is cut off, according to the display cycle identifier Df.

Furthermore, the image decoding apparatus 2200 includes a display unit 2230 which receives the display cycle multiplier data Dm and the display time data Dyn through the first and second ON/OFF switches 2240 and 2250, respectively, as well as the sub-unit time data Dk and the decoded image data Rg, and performs image display at the prescribed display timing based on these data.

The operation of the image decoding apparatus 2200 will be described briefly. When the multiplexed bit stream M2 from the image coding apparatus 1200 is input to the image decoding apparatus 2200, in the demultiplexer 2210, the sub-unit time data Dk, the display cycle identifier Df, and the display cycle multiplier data Dm are separated from the multiplexed bit stream M2 and, furthermore, the display time data Dyn and the coded image data Cgn are separated frame by frame from the bit stream M2.

The coded image data Cgn of each frame is decoded by the decoder 2220 and then output as decoded image data Rg toward the display unit 2230. Meanwhile, the sub-unit time data Dk is output directly to the display unit 2230. The display cycle multiplier data Dm is output through the first ON/OFF switch 2240, which is turned on or off by the display cycle identifier Df, toward the display unit 2230, while the frame display time data Dyn is output through the second ON/OFF switch 2250, which is turned on or off by the display cycle identifier Df, toward the display unit 2230. When the multiplexed bit stream M2 is the coded image signal 120a having a fixed display cycle, the first and second ON/OFF switches 2240 and 2250 are in the ON states, and when the multiplexed bit stream M2 is the coded image signal 120b having a variable display cycle, the first and second ON/OFF switches 2240 and 2250 are in the OFF states.

In the display unit 2230, the image of each frame corresponding to the decoded image data Rg having a fixed display cycle is displayed at a prescribed display timing based on the sub-unit time data Dk and the display cycle multiplier data Dm. In this case, the display timing of each frame is the display time h'(n') which is obtained by an arithmetic expression, h'(n')=T × n'(T=(1/N)×M). On the other hand, the image of each frame corresponding to the decoded image data Rg having a variable display cycle is displayed at a prescribed timing based on the display time data Dyn. In this case, the display timing is the display time h(n) which is decided by the display time data Dyn.

As described above, according to the second embodiment of the invention, since the data structure of the coded image signal includes the sub-unit time data Dk indicating the length of the sub-unit time (1/N), which is obtained by dividing a prescribed time interval with N (natural number), by the natural number N, and the display cycle multiplier data Dm indicating the fixed frame display cycle T by a multiplier M for the sub-unit time (1/N), in addition to the display cycle identifier Df indicating whether the display cycle of each frame is variable or not. Therefore, when processing a coded image signal having a fixed frame rate, the value of the fixed frame rate of the coded image signal can be detected before decoding each frame, whereby the various hardware structures for implementing the image display can be simplified.

Further, the data structure of the coded image signal according to the second embodiment includes the sub-unit time data Dk, the display cycle identifier Df, the display cycle multiplier data Dm, and the display time data Dyn, these data being used for setting the display timing of each frame, as additional data for deciding the timing of reproduction for each frame at the decoding end. However, in place of those additional data for deciding the display timing of each frame, the data structure of the coded image signal may includes additional data for deciding the timing of decoding each frame, i.e., sub-unit time data, decoding cycle identifier, decoding cycle multiplier data, and decoding time data. Hereinafter, such data structure will be described as a modification of the second embodiment.

(Modification of Embodiment 2)

In the data structure according to the modification of the second embodiment, the display cycle identifier Df and the display cycle multiplier data Dm in the coded image signal 120a of the second embodiment are replaced with a decoding cycle identifier DEf and decoding cycle multiplier data DEp, and the display time data Dyn in the coded image signal 120b of the second embodiment is replaced with decoding time data DEyn.

The decoding cycle identifier DEf indicates whether the cycle of a decoding process for decoding a coded image signal of each frame is variable or not. A fixed decoding cycle identifier DEf is inserted in a coded image signal, the decoding cycle DT of which is fixed, while a variable decoding cycle identifier DEf is inserted in a coded image signal, the decoding cycle DT of which is variable.

The decoding cycle multiplier data DEm indicates the frame decoding cycle DT by a multiplier M for the sub-unit time (1/N), i.e., it indicates how many times (M) the decoding cycle DT is as long as the sub-unit time. The decoding time data DEyn indicates the timing at which decoding of each frame is carried out.

The coding process for generating the coded image signal having the data structure according to this modification of the second embodiment is realized by replacing steps S31, S32, S33, S34, and S36 in the flow of FIG. 8 as follows.

That is, the process of deciding the display cycle in step S31 is replaced with the process of deciding whether the decoding cycle is fixed or not; the process of adding the fixed display cycle identifier Df in step S32 is replaced with the process of adding the fixed decoding cycle identifier DEf; and the process of adding the variable display cycle identifier Df in step S34 is replaced with the process of adding the variable decoding cycle identifier DEf. Further, the process of adding the display cycle multiplier data Dm in step S33 is replaced with the process of adding the decoding cycle multiplier data DEm; and the process of adding the display time data Dyn in step S36 is replaced with adding the decoding time data DEyn.

FIG. 9(b) shows the structure of an image coding apparatus 1200a as hardware for performing the coding process according to the modification of the second embodiment.

The image coding apparatus 1200a includes a decision unit 1131a for deciding whether the frame decoding cycle of the input image signal Sg is fixed or not, i.e., fixed or variable, and outputting a decoding cycle identifier DEf indicating whether the decoding cycle is fixed or not, in place of the decision unit 1131 included in the image coding apparatus 1200 of the second embodiment.

The image coding apparatus 1200a includes a decoding cycle multiplier data generator (second data generator) 1233a which generates the decoding cycle multiplier data DEm indicating the frame decoding cycle by a multiplier M for the sub-unit time (1/N), based on the input image signal Sg, in place of the display cycle multiplier data generator 1233 of the image coding apparatus 1200. The apparatus 1200a further includes a decoding time data generator (third data generator) 1234a which generates the decoding time data DEyn indicating the decoding time Dh(n) of each frame F(n), based on the input image signal Sg, in place of the display time data generator 1234 of the image coding apparatus 1200.

In the image coding apparatus 1200a, the multiplexer (MUX) 1220a multiplexes the sub-unit time data Dk, the decoding cycle multiplier data DEm, and the decoding time data DEty with the coded image data Cgn of each frame F(n), and outputs a coded image signal having a fixed decoding cycle or a coded image signal having a variable decoding cycle as a multiplexed bit stream M2a.

Other constituents of the apparatus 1200a are identical to those of the image coding apparatus 1200 of the second embodiment.

Hereinafter, the operation of the image coding apparatus 1200a according to the modification of the second embodiment will be briefly described.

When the image signal Sg is input to the apparatus 1200a, the decision unit 1131a decides whether the decoding cycle of the image signal Sg is variable or not, and outputs the decoding cycle identifier DEf indicating the result of the decision. Meanwhile, the first data generator 1232a generates the sub-unit time data Dk, and the second and third data generators 1233a and 1234a generate the decoding cycle multiplier data DEm and the decoding time data DEyn, respectively. The encoder 1110 encodes the image signal Sg and outputs coded image data Cgn.

The decoding cycle identifier DEf from the decision unit 1131a, the coded data Cgn from the encoder 1110, and the data Dk and DEyn from the first and the third data generators 1232 and 1234a are input to the multiplexer 1220a. Further, the decoding cycle multiplier data DEm from the second data generator 1233a is input to the multiplexer 1220a through the switch 1241a. The multiplexer 1220a multiplexes these data, and outputs a coded image signal having a fixed decoding cycle or a variable decoding cycle as the multiplexed bit stream M2a.

On the other hand, the process for decoding the coded image signal having the data structure according to this modification of the second embodiment is realized by replacing steps S41, S42a, S43b, S44a, S44b, S45a, and S47a in the flow of FIG. 10 as follows.

That is, the process of deciding the display cycle in step S41 is replaced with the process of deciding whether the decoding cycle is fixed or not; the process of reading the display cycle multiplier data Dm in step S42a is replaced with the process of reading the decoding cycle multiplier data DEm; and the process of reading the data Dyn indicating the display time h(n) in step S43b is replaced with the process of reading the data DEyn indicating the decoding time Dh(n).

Further, the process of obtaining the display time h(n) based on the data Dyn in step S44b is replaced with the process of obtaining the decoding time Dh(n) based on the data DEyn; and the process of setting the count value n' to 0 in step S44a, which count value corresponds to the number n' of each frame F'(n') counted in the display order from the head frame, is replaced with the process of setting the count value n to 0, which count value corresponds to the number n of each frame F(n) counted in the transmission order from the head frame.

Further, the process of obtaining the display time h'(n') of each frame F'(n') by h'(n')=n'×T in step S45a is replaced with the process of obtaining the decoding time Dh(n) of each frame F(n) by Dh(n)=n×DT based on the decoding cycle DT and the number n indicating the transmission order of the frame; and the process of incrementing the count value n' in step S47a is replaced with incrementing the count value n.

FIG. 11(b) is a block diagram illustrating the structure of an image decoding apparatus 2200a as hardware performing the decoding process according to the modification of the second embodiment.

The image decoding apparatus 2200a receives the multiplexed bit stream M2a output from the image coding apparatus 1200a, and subjects the multiplexed bit stream M2a to reproduction including decoding and display.

More specifically, the image decoding apparatus 2200a includes a demultiplexer (DEMUX) 2210a for extracting, from the multiplexed bit stream M2a, the sub-unit time data Dk, the decoding cycle identifier DEf, the decoding cycle multiplier data DEm, the decoding time data DEyn, and the coded image data Cgn, and outputting these data, in place of the demultiplexer 2210 of the image decoding apparatus 2200 of the second embodiment.

Further, the image decoding apparatus 2200a includes, in place of the first and second ON/OFF switches 2240 and 2250 of the image decoding apparatus 2200, a first ON/OFF switch 2240a for switching the circuit between the ON state where the decoding cycle multiplier data DEm is transmitted and the OFF state where the data DEm is cut off, based on the decoding cycle identifier DEf; and a second ON/OFF switch 2250a for switching the circuit between the ON state where the decoding time data DEyn is transmitted and the OFF state where the data DEyn is cut off, based on the decoding cycle identifier DEf.

In the image decoding apparatus 2200a, the sub-unit time data Dk from the demultiplexer 2210a, and the decoding cycle multiplier data DEm and the decoding time data DEyn from the first and second ON/OFF switches 2240a and 2250a are supplied to the decoder 2220a and the display unit 2230a.

In the decoder 2220a, the coded image data Cgn of each frame F(n), the decoding cycle of which is fixed, is decoded frame by frame at the timing (decoding time Dh(n)=DT×n) decided by the sub-unit time data Dk and the decoding cycle multiplier data DEm, while the coded image data Cgn of each frame F(n), the decoding cycle of which is variable, is decoded frame by frame at the timing (decoding time Dh(n)) decided by the decoding time data DEyn.

Further, in the display unit 2230a, the decoded image data Rg of each frame F(n), the decoding cycle of which is fixed, is displayed frame by frame at the timing (display time h(n)) decided by the sub-unit time data Dk and the decoding cycle multiplier data DEm, while the decoded image data Rg of each frame F(n), the decoding cycle of which is variable, is displayed frame by frame at the timing (display time h(n)) decided by the decoding time data DEyn.

Other constituents of the image decoding apparatus 2200a are identical to those of the image decoding apparatus 2200 of the second embodiment.

Hereinafter, the operation of the image decoding apparatus 2200a will be described briefly.

When the multiplexed bit stream M2a is input to the apparatus 2200a, in the demultiplexer 2210a, the sub-unit time data Dk, the decoding cycle multiplier data DEm, the decoding cycle identifier DEf, the decoding time data DEyn, and the coded image data Cgn are separated from the bit stream M2a.

In the decoder 2220a, when the decoding cycle of the input coded image signal is fixed, the coded image data Cgn is decoded frame by frame at the timing decided by the sub-unit time data Dk and the decoding cycle multiplier data DEm. When the decoding cycle of the input decoded image signal is variable, the coded image data Cgn is decoded frame by frame at the timing (decoding time Dh(n)) decided by the decoding time data DEyn. The decoding time of the coded image signal, the decoding cycle of which is fixed, is decided by the product of the number n indicating the transmission order and the decoding cycle DT(=(1/N)×M), and the decoding time of the coded image signal, the decoding cycle of which is variable, is decided by the decoding cycle data DEyn.

In the display unit 2230a, the image of each frame F(n) corresponding to the decoded image data Rg, the decoding cycle of which is fixed, is displayed at a prescribed timing based on the sub-unit time data Dk and the display cycle multiplier data DEm. On the other hand, the image of each frame F(n) corresponding to the decoded image data Rg, the decoding cycle of which is variable, is displayed at a prescribed timing based on the decoding time data DEty.

In this modification of the second embodiment, as in the second embodiment, the coded image signal Cgn obtained by coding an image signal includes the decoding cycle identifier DEf indicating whether the cycle of image decoding for each frame is variable or not, the sub-unit time data Dk and the decoding cycle multiplier data DEm which indicate a fixed decoding cycle, and the decoding time data DEyn which indicates the decoding time. Therefore, when the cycle of image decoding for each frame is fixed, the coded image signal can be decoded by a simple circuit structure, i.e., based on the sub-unit time data Dk corresponding to one image and the decoding cycle multiplier data DEm having a relatively small data quantity (bit number), without referring to the decoding time data DEyn having a relatively large data quantity (bit number) for each frame.

Further, when the cycle of image decoding for each frame is variable, as in the conventional decoding process, the coded image signal can be decoded with reference to the decoding time data DEyn for each frame.

In the modification of the second embodiment, emphasis has been placed on an image decoding apparatus 2200a which performs image display of each frame as well as decoding of each frame according to data for deciding the decoding timing of each frame, which data is included in the coded image signal. However, an image decoding apparatus which performs decoding of each frame as well as image display of each frame according to data for deciding the display timing of each frame, which data is included in the coded image signal, is also within the scope of the present invention.

In this case, the decoding timing at which decoding of each frame is carried out is set according to display timing data of plural frames including an object frame to be decoded. That is, based on the display timing data of the object frame and the display timing data of the next frame transmitted subsequently to the object frame, the decoding timing of the object frame is set at a timing that is earlier, by a prescribed offset time, than the earlier display timing between the display timings of the object frame and the next frame.

To be specific, when the display timing of the object frame is earlier than the display timing of the next frame transmitted subsequently to the object frame, the offset time is set to a length longer than the time required for decoding the object frame. On the other hand, when the display timing of the next frame (for example, B-VOP) transmitted subsequently to the object frame (for example, P-VOP) is earlier than the display timing of the object frame, the offset time is set to a length longer than the sum of the time required for decoding the object frame and the time required for decoding the next frame.

When a coding program or a decoding program for implementing, with software, the image processing by the coding apparatus or the decoding apparatus according to any of the first and second embodiments and the modifications thereof, is recorded in data storage media such as a floppy disk, the image processing can be easily executed in an independent computer system.

Figure 12:
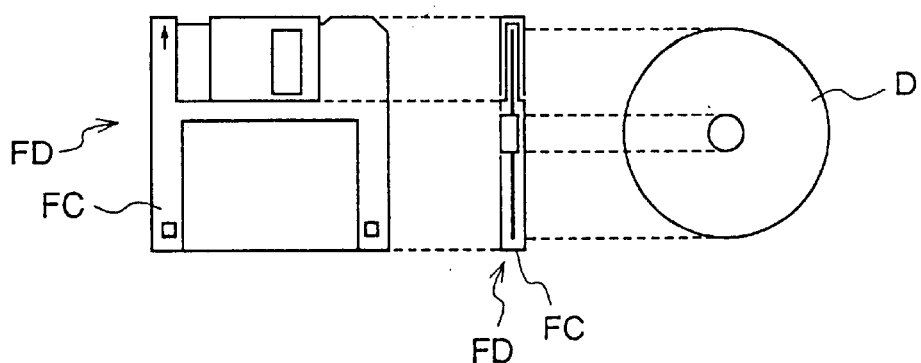
FIGS. 12(a) and 12(b) are diagrams for explaining a data storage medium containing a program for executing the coding or decoding process according to any of the aforementioned embodiments by a computer system.
FIG. 12(c) is a diagram for explaining the computer system.
Figure 12:
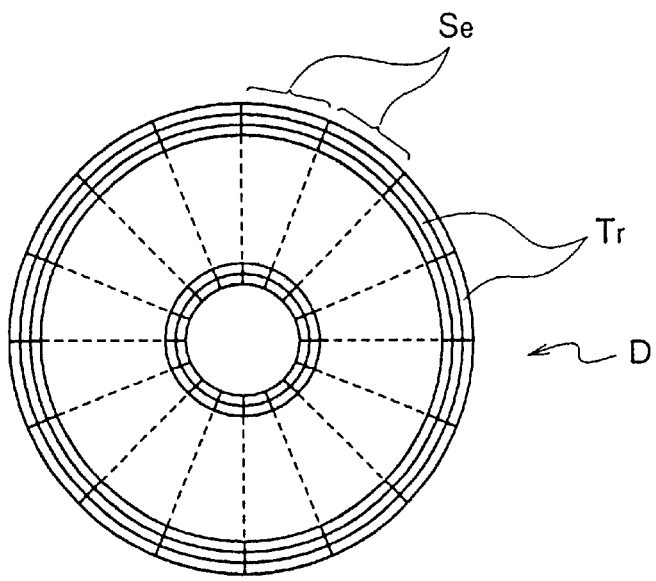
Figure 12:
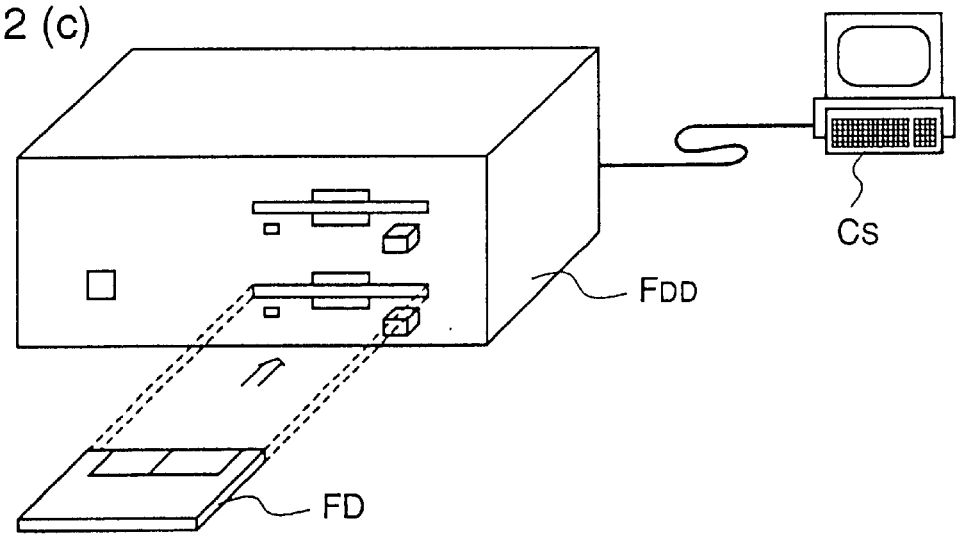

FIGS. 12(a)–12(c) are diagrams for explaining the case where the coding process or the decoding process according to any of the embodiments and the modifications of the invention is executed by a computer system using a floppy disk which contains the coding program or the decoding program.

FIG. 12(a) shows a front view of a floppy disk FD, a cross-sectional view thereof, and a floppy disk body D. FIG. 12(b) shows an example of a physical format of the floppy disk body D.

The floppy disk body D is contained in a case FC, providing the floppy disk FD. On the surface of the disk body D, a plurality of tracks Tr are formed concentrically from the outer circumference of the disk toward the inner circumference. Each track is divided into 16 sectors (Se) in the angular direction. Therefore, in the floppy disk FD containing the above-mentioned program, data of the program are recorded in the assigned sectors on the floppy disk body D.

FIG. 12(c) shows the structure for recording the program in the floppy disk FD and performing the image processing by software using the program stored in the floppy disk FD.

To be specific, when the program is recorded in the floppy disk FD, data of the program are written in the floppy disk FD from the computer system Cs through the floppy disk drive FDD. When the above-mentioned image coding apparatus or image decoding apparatus is constructed in the computer system Cs by the program recorded in the floppy disk FD, the program is read from the floppy disk FD by the floppy disk drive FDD and then loaded to the computer system Cs.

Although a floppy disk is employed as a data storage medium in the above description, an optical disk may be employed. Also in this case, the coding process or the decoding process can be performed by software in similar manner to the case of using the floppy disk. The data storage medium is not restricted to the floppy disk and the optical disk, and any medium may be employed as long as it can contain the program, for example, an IC card or a ROM cassette.

Furthermore, assuming that a coded image signal stored in a data storage medium such as a floppy disk has a data structure according to any of the first and second embodiments and the modifications thereof, when the coded image signal from the floppy disk is decoded and the image corresponding to the decoded image signal is displayed, it is possible to perform reproduction of the coded image signal, including decoding and image display of the image signal, with a simple circuit structure if the frame display cycle or the frame decoding cycle is fixed.

What is claimed is:

1. An image signal corresponding to a plurality of frames included in a video sequence, said image signal comprising:
   a display cycle identifier operable to indicate if all intervals between image display times of successive frames in the plurality of frames included in the video sequence are either constant or can be variable, the display cycle identifier being included in each header of the video sequence; and
   display timing data operable to indicate a timing of an image display for a frame in the plurality of frames when the display cycle identifier indicates that the intervals can be variable.

2. A decoding method for decoding an image signal which includes coded image data corresponding to a plurality of frames included in a video sequence, a display cycle identifier, and display timing data operable to indicate a timing of an image display for a frame in the plurality of frames, said method comprising:
   generating decoded image data by decoding the coded image data, wherein the display cycle identifier is operable to indicate if all intervals between image display times of successive frames in the plurality of frames included in the video sequence are either constant or can be variable, the display cycle identifier being included in each header of the video sequence; and
   determining an image display time for the decoded image data by referring to the display timing data when the display cycle identifier indicates that the intervals can be variable.

3. An image decoding apparatus for decoding an image signal which includes coded image data corresponding to a plurality of frames included in a video sequence, a display cycle identifier, and display timing data operable to indicate a timing of an image display for a frame in the plurality of frames, said apparatus comprising:
   a decoding device operable to generate decoded image data by decoding the coded image data, the display cycle identifier being operable to indicate if all intervals between image display times of successive frames in the plurality of frames included in the video sequence are either constant or can be variable, the display cycle identifier being included in each header of the video sequence; and
   a display time determining device operable to determine an image display time for the decoded image data by referring to the display timing data when the display cycle identifier indicates that the intervals can be variable.

4. A computer readable data storage medium for use with a computer for image processing, said computer readable data storage medium comprising:
   an image signal corresponding to a plurality of frames included in a video sequence;
   wherein said image signal comprises:
      a display cycle identifier operable to indicate if all intervals between image display times of successive frames in the plurality of frames included in the video sequence are either constant or can be variable, the display cycle identifier being included in each header of the video sequence; and
   display timing data operable to indicate a timing of an image display for a frame in the plurality of frames when the display cycle identifier indicates that the intervals can be variable.

5. A computer program embodied on a computer readable data storage medium for use with a computer for decoding an image signal which includes coded image data corresponding to a plurality of frames included in a video sequence, a display cycle identifier, and display timing data operable to indicate a timing of an image display, said computer program comprising:

computer readable program code operable to cause the computer to generate decoded image data by decoding the coded image data, wherein the display cycle identifier is operable to indicate if all intervals between image display times of successive frames in the plurality of frames included in the video sequence are either constant or can be variable, the display cycle identifier being included in each header of the video sequence; and computer readable program code operable to cause the computer to determine an image display time for the decoded image data by referring to the display timing data when the display cycle identifier indicates that the intervals can be variable.

* * * * *